April 30, 1968 W. E. BAKER ETAL 3,381,095

CAMP-ON CIRCUIT

Filed Jan. 19, 1965 21 Sheets-Sheet 1

INVENTORS: W. E. BAKER
V. R. DE STEFANO
H. A. MEISE, JR.

BY Donald M. Duft
ATTORNEY

April 30, 1968 W. E. BAKER ET AL 3,381,095

CAMP-ON CIRCUIT

Filed Jan. 19, 1965 21 Sheets-Sheet 3

April 30, 1968 W. E. BAKER ETAL 3,381,095

CAMP-ON CIRCUIT

Filed Jan. 19, 1965 21 Sheets-Sheet 4

April 30, 1968 W. E. BAKER ETAL 3,381,095

CAMP-ON CIRCUIT

Filed Jan. 19, 1965 21 Sheets-Sheet 5

FIG. 7
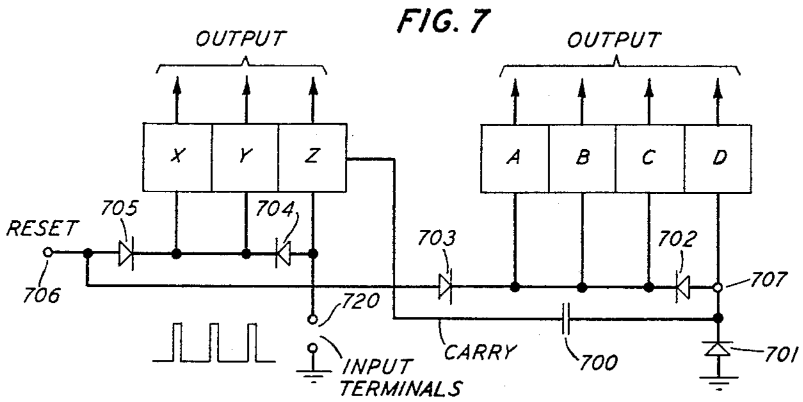
FIG. 8
| | A | B | C | D |
|---|---|---|---|---|
| X | 1 | 4 | 7 | 0 |
| Y | 2 | 5 | 8 | |
| Z | 3 | 6 | 9 | R |
FIG. 9
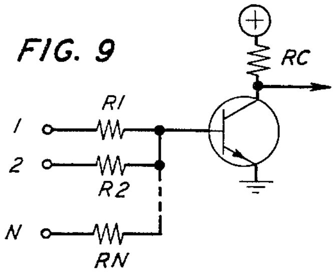
FIG. 10
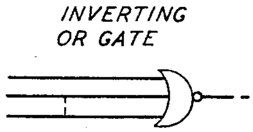
FIG. 11
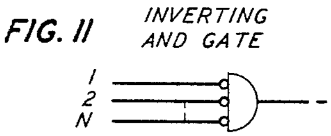
FIG. 12
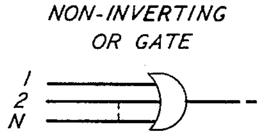
FIG. 13
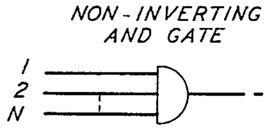
FIG. 10B
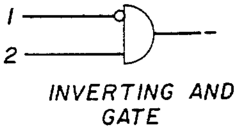
FIG. 10A
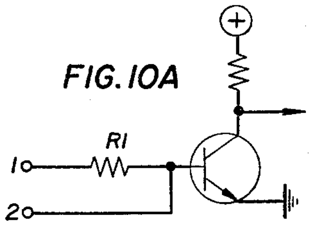

CAMP-ON CIRCUIT

Filed Jan. 19, 1965 21 Sheets-Sheet 11

April 30, 1968 W. E. BAKER ET AL 3,381,095

CAMP-ON CIRCUIT

Filed Jan. 19, 1965 21 Sheets-Sheet 12

April 30, 1968 W. E. BAKER ETAL 3,381,095

CAMP-ON CIRCUIT

Filed Jan. 19, 1965 21 Sheets-Sheet 14

CAMP-ON CIRCUIT

April 30, 1968 W. E. BAKER ETAL 3,381,095

CAMP-ON CIRCUIT

Filed Jan. 19, 1965 21 Sheets-Sheet 16

April 30, 1968 W. E. BAKER ETAL 3,381,095

CAMP-ON CIRCUIT

Filed Jan. 19, 1965 21 Sheets-Sheet 17

CAMP-ON CIRCUIT

Filed Jan. 19, 1965 21 Sheets-Sheet 21

United States Patent Office 3,381,095
Patented Apr. 30, 1968

3,381,095

CAMP-ON CIRCUIT

William E. Baker, Middletown, Vincent R. De Stefano, Lincroft, and Henry A. Meise, Jr., Middletown Township, Monmouth County, N.J., assignors to Bell Telephone Laboratories, Incorporated, New York, N.Y., a corporation of New York Filed Jan. 19, 1965, Ser. No. 426,508
39 Claims. (Cl. 179—27)

ABSTRACT OF THE DISCLOSURE

A PBX equipped for camp-on service is disclosed which upon the receipt of an incoming call directed to a busy line, establishes a network connection between the calling circuit and a camp-on circuit. Subsequent to the establishment of this connection, (1) the number of the line to be camped on is transferred from a called number register to a register in the camp-on circuit, (2) the number on each call subsequently served by the system is compared with that in the camp-on register in order to assure that the party connected to the camp-on circuit is given priority in obtaining a connection to the camped-on line, (3) the busy state of the camped-on line is repeatedly tested under control of the camp-on register, and (4) the waiting call is connected to the camped-on line when it becomes idle.

This invention relates to a camp-on circuit, and more particularly to a camp-on circuit suitable for use with an electronic telephone switching system.

The major functions of a camp-on circuit in any telephone switching system are: (1) to determine that a newly initiated call cannot be completed in the event the called station is already busy on a priorly initiated call; (2) to provide facilities for holding the newly arrived call in the event that the calling party prefers to camp on and wait for the called station to become idle; (3) to monitor the status of the called line; (4) to control the completion of the connection to the camped-on called station when it becomes idle. The prior art discloses many camp-on circuits which perform these functions in the particular systems for which they were designed. Included among these are camp-on circuits for step-by-step, crossbar, and other types of electromechanical systems.

It is generally recognized that electronic switching systems, and particularly those of the solid state type, due to their greater flexibility, are able to provide both improved and a wider variety of telephone service. The prior art camp-on circuits, although adequate in the systems for which they were designed, are not ideally suitable for use with electronic switching systems. A need therefore currently exists for a new and improved type of camp-on circuit specifically designed to utilize the higher speed and other superior features of electronic switching systems.

It is therefore an object of the invention to provide a camp-on circuit that is suitable for use with electronic switching systems.

It is a further object of the invention to provide an electronic solid state camp-on circuit having physical and electrical capabilities that are compatible with electronic solid state switching systems.

In accordance with the present invention, an electronic solid state camp-on circuit is provided whose speed of operation, as well as its other electrical and physical capabilities, is such that it is fully compatible with and operates in a manner that fully utilizes the improved features of electronic switching systems. The camp-on circuit of the present invention basically comprises: (1) data storage facilities for receiving and storing the number of the called line on a call for which camp-on service is desired, (2) facilities for repeatedly testing for the busy or idle condition of the camped-on line; (3) facilities for preventing subsequently initiated calls from obtaining a connection to a camped-on line ahead of a party camping on; (4) facilities for applying a distinctive tone to a camped-on line in order to inform the called party that someone is camping on his line; and (5) facilities for controlling the completion of a connection to a camped-on called line when it becomes idle.

The data storage facilities receive and store the called line number on a camp-on call after it is determined that the called line is busy. Once the camped-on line number is registered in the storage facilities, it remains there for subsequent use by the camp-on circuit until the call is successfully completed to the called station as it becomes idle, or until the calling party drops the call. This registered number is subsequently used to control the repeated testing of the camped-on line to determine whether it is busy or idle. Also, the registered number is compared with the called station number on each call subsequently served by the system in order to ensure that no subsequently initiated call can obtain a connection to a camped-on line ahead of a party already camping on. On each such comparison operation, the subsequently initiated call is permitted to proceed to completion in the normal manner if the called number dialed by the calling party does not match the number registered in the camp-on storage facilities. On the other hand, if the two numbers do match, the subsequently initiated call is not completed and is routed to a busy tone source. The called line number registered in the camp-on circuit is further used for controlling the completion of the calling connection once the camped-on line becomes idle.

The facilities for repeatedly testing the camped-on line to determine whether it is busy or idle includes equipment for reading out the called line number from the data storage facilities, together with equipment for transmitting the readout number to the control circuitry of the system which then makes the necessary busy test and transmits its findings back to the camp-on circuit. If the camp-on circuitry receives a busy indication, it does not complete the call and, instead, proceeds to make similar tests for any other camp-on calls it currently may be handling. Shortly thereafter, it returns and makes a subsequent test of all camped-on lines one at a time. The speed of operation of the testing circuitry is such that each camped-on line is tested for a busy or idle condition once every 500 milliseconds. If the camp-on circuit receives an idle indication on a test, it initiates the circuit actions required to complete a connection to the camped-on line that has gone idle.

The facilities for preventing a subsequently initiated call from obtaining a connection to a camped-on called line ahead of the party currently camping on includes equipment for receiving the called station number dialed for each newly attempted call, equipment for reading out the number of the camped-on called line, together with equipment for comparing the two numbers. If the newly dialed number does not match the camped-on line number, it indicates that the called line is not being camped on. The camp-on equipment transmits a signal to this effect back to the system, which then completes the newly attempted call in the normal manner. On the other hand, if the comparison circuitry detects a match between the newly dialed number and a camped-on number, it transmits a match signal back to the system, which does not complete the call and, instead, returns a busy signal to the calling station in the same manner as if the calling party had dialed the number of a station which was busy but not camped on.

The camp-on tone source comprises a transistor oscillator which generates an output signal when a line that is camped on it first tested for a busy condition. This signal is applied to the tip and ring of the camped-on line to advise the camped-on called subscriber that someone is attempting to reach him. This tone is applied only once in order to minimize interference to the camped-on party.

The facilities for completing a camped-on call include equipment for receiving an indication that a camped-on line has gone idle, equipment for reading out the number of the camped-on line from the data storage facilities, and equipment for transmitting this number to the central control of the system which, in response thereto, establishes a connection between the calling incoming trunk and the called line.

The system of which the camp-on circuit comprising the present invention is a part utilizes code leads for the transmission of called station number information between the various circuits of the system. In the exemplary embodiment of the invention disclosed herein, there are fewer than 100 lines, and calls are completed by the dialing of two digits. The code leads are divided into two groups, one of which is for the transmission of the units digit while the other is for the transmission of the tens digit information. Each code lead group comprises a plurality of signal conductors over which data is transmitted in combinational code form by the grounding of various combinations of leads.

The code leads interconnect the line circuits, dial pulse registers, the camp-on circuit, and a common control circuit which regulates and controls the progress of every call served by the system. Each line circuit is connected to four of the plurality of code leads, with two of its code leads being connected to the tens digits group and two to the units digit group. The interconnections between the code leads and the line circuits are such that each line circuit is connected to a unique combination of four code leads; and the four code leads to which it is connected represent, in the code used, the tens and units digit assigned to the line circuit.

Each line circuit contains a bistable element whose conductive condition may be controlled, in part, by the potentials applied to its four code leads. The bistable element comprises, in part, a transistor gate circuit which is driven to saturation whenever one or more of its four code leads is held at a positive potential. Conversely, a gate is held in an OFF condition, during which no collector current flows, whenever all four code leads of its line circuit are grounded. The common control circuit is interconnected by means of signal leads with the gate of each line circuit and, by means of these leads, maintains constant supervision over the current conductive condition of all gates. The relationship between the line circuits, the code leads, and the common control is explained in greater detail hereinafter. Suffice it to say, at this point, that the code leads permit the conductive state of the gate in each line circuit to be selectively controlled by the potentials applied to the code leads. The common control, by virtue of its capability to monitor the conductive state of all line circuit gates, is able to control and regulate the progress of each call served by the system.

The registers receive the called station designation in dial pulse form from the calling station for each call served by the system. The received pulses, after being counted and stored by the register, are subsequently read out of the register and applied in combinational code form to the code leads under control of the common control circuit. This grounds the four code leads of only the called line circuit, as signified by the number stored in the register, and turns OFF its bistable gate.

The code leads also extend to the camp-on circuit in order that it may receive from and transmit digital information to the remainder of the system in order to perform the functions required of it in connection with the serving of a camp-on call. In connection with the performance of these functions, the camp-on circuit first uses the code leads to receive the number of a line that is to be camped on. The camp-on circuit subsequently repeatedly tests the busy condition of a camped-on line so that it can complete a connection to the called line when it becomes idle. In connection with this testing function, the camp-on circuit applies the called line number to the code leads to control once again the conductive condition of the bistable gate in the camped-on line circuit. The common control monitors the results of this test and, in turn, informs the camp-on circuit whether the camped-on line is still busy or whether it has gone idle. Once the camp-on circuit determines that a camped-on line has become idle, it then gates out the number of the line onto the code leads and thereby turns OFF the gate in its line circuit. The common control at this time, by virtue of its signal connections to the line circuits, determines which line circuit gate has changed its conductive state and, in response thereto, controls the completion of the desired connection to the camped-on line.

The data storage facilities within the camp-on circuit comprise a two-digit counter which is arbitrarily set during its normal condition to a number higher than that assigned to any of the line circuits in the system. There are assumed to be 80 line circuits designated 10 through 89 in the disclosed exemplary embodiment in the invention. The tens order counter of the camp-on circuit is always reset to a count of 9 at the end of its usage on a call. The units order of the counter is not reset and it continues to store the last digit that was entered into it. Subsequently, when camp-on service is desired for a newly initiated call, both the called number dialed into the register as well as the number in the camp-on counter, is gated onto the code leads. These two numbers cannot match, and therefore, as subsequently described in detail, at least one code lead for every line circuit in the system, including the called line circuit, is supplied with a HIGH potential which holds ON its transistor gate circuit. At this time, the camp-on counter is connected by means of a control gate to a source of clock pulses which advances the counter one step for each pulse generated. The counter advances through its various operative positions and, in so doing, changes the combination of code leads grounded by it as it advances from position to position. Finally, when the setting of the camp-on counter matches the camped-on line number stored in the register, the numbers gated onto the code leads by both the register and the camp-on circuit agree. At this time, the four code leads of the line circuit to be camped on are grounded and its transistor gate turns OFF. The common control detects this turn-off and signals the camp-on circuit to this effect, which disconnects the camp-on counter from the pulse source. This leaves the counter set in the position corresponding to the number of the camped-on line.

The number now in the camp-on counter may be used one or more times, as before described, during the serving of the camp-on call. For example, it has already been mentioned how the number dialed for any subsequently initiated call is always compared with the number stored in the camp-on circuit in order to prevent the subsequently initiated call from obtaining a connection to the camped-on line ahead of the party already camping on. This comparison is done in the following manner. The newly dialed number in the register is gated onto the code leads and, at the same time, the line number in the camp-on counter is gated onto the code leads. If the two numbers do not match, at least one code lead of every line circuit will be HIGH and the transistor gate in each line circuit will be held in an ON condition. If the two numbers do match, the four code leads of the camped-on line circuit will be grounded and the gate of this line circuit will turn OFF.

The common control ascertains, at the end of the comparison operation, whether all line circuit gates are ON or, alternatively, whether one is turned OFF. It then either allows the newly initiated call to proceed to completion or routes it to a busy tone source, depending upon whether the line it is attempting to reach is already camped on.

The camped-on line number is read out of the camp-on counter at the beginning of each busy test of the camped-on line and is applied to the code leads in the form of ground potentials in the same manner as already described. This grounds all four code leads of the camped-on line and turns its transistor gate OFF. The battery potential appearing on the collector of the cutoff transistor at this time is either routed to an output terminal signifying that the line is busy, or to a different output terminal signifying that the line is idle, depending upon the status of the cutoff relay within the line circuit. The particular output terminal to which the potential is applied at this time is detected by the common control circuit, which, by means of built-in logic, ascertains whether the camped-on line is busy or idle. If the line is still busy, the camp-on circuit is notified to this effect and it proceeds to make corresponding tests for other camp-on calls it may be serving. If the common control determines that the camped-on line is idle, it notifies the camp-on circuit of this. The camp-on circuit and the common control circuit together then proceed to disconnect the calling party from the camp-on circuit and connect him to the camped-on line that has just become idle.

A feature of the invention is the provision in a camp-on circuit of a counter which is set to the number corresponding to a line that is to be camped on by advancing its operative position, step by step, until the setting of the counter corresponds to that of the line to be camped on.

A further feature of the invention is the provision of facilities for setting the camp-on counter to the number of the line to be camped on by comparing its output with that of the number to be entered therein, by then advancing the counter one operative position, by then alternately comparing and advancing the counter to its next position if the two numbers do not match, and by continuing this procedure until the number in the camp-on counter matches the number of the line that is to be camped on.

A further feature of the invention is the combination of a register, a comparison circuit, and a camp-on counter wherein the counter is initially set to the number of a line that is to be camped on by comparing the number stored therein with the number of the camped-on line stored in the register, and by then advancing the counter, step by step, until the comparison circuit detects a match between the two numbers.

A further feature of the invention is the provision of a circuit for comparing a newly dialed called number with a number stored in the camp-on circuit in order to prevent a newly initiated call from obtaining a connection to a camped-on line ahead of the party that has been waiting in a camp-on status for the line to become idle.

A further feature of the invention is the provision of facilities for ensuring that calling party on a camp-on call has first priority in reaching the camped-on line when it becomes idle: (1) by applying both the called number on any newly initiated call and the number of a camped-on line to a comparison circuit, (2) by permitting the newly initiated call to proceed to completion if the comparison circuit does not detect a match between the two numbers, and (3) by preventing the newly initiated call from obtaining the requested connection if the comparison circuit detects a match.

A further feature of the invention is the provision in a switching system with camp-on facilities of line circuits having bistable gates, equipment for applying to the line circuits an indication of a camped-on line number, equipment for switching only the conductive condition of the gate within the camped-on line circuit in response to the readout of this number from the camp-on circuit, together with equipment for determining the busy or idle status of the camped-on line in response to the change of state of its bistable conductive element.

These, and other objects and features will become more apparent upon a reading of the following description of an exemplary embodiment of the invention taken in conjunction with the drawing, in which:

FIG. 1 discloses diagrammatically the various circuits comprising the present invention;

FIGS. 2 and 3 illustrate the manner in which the circuits of FIG. 1 are interconnected during the serving of a camp-on call;

FIGS. 4A, 4B, and 4C illustrate the manner in which data is interchanged via the code leads between the circuits of FIG. 1 during the serving of calls;

FIG. 5 illustrates the details of the basic circuit that is extensively used as a pulse counter in the present invention;

FIG. 6 comprises a diagrammatic symbolization of the counter of FIG. 5;

FIG. 7 illustrates the manner in which the counter circuits of FIGS. 5 and 6 may be interconnected to form a two-stage counter operable in combinational code form;

FIG. 8 illustrates the 3 by 4 code in accordance with which the counter of FIG. 7 operates;

FIG. 9 illustrates the basic transistor-resistor logic inverter circuit that is utilized extensively in the present system as both an AND and an OR gate;

FIG. 10 illustrates the symbol used when the circuit of FIG. 9 is operated as an inverting OR gate;

FIG. 10A illustrates a modification of the circuit shown in FIG. 9;

FIG. 10B illustrates the symbol used when the circuit of FIG. 10A is operated as an inverting AND gate;

FIG. 11 illustrates the symbol used when the circuit of FIG. 9 is operated as an inverting AND gate;

FIG. 12 illustrates the symbol used to represent a non-inverting OR gate;

FIG. 13 illustrates the symbol used to represent a non-inverting AND gate, and

Figures 14, 27:
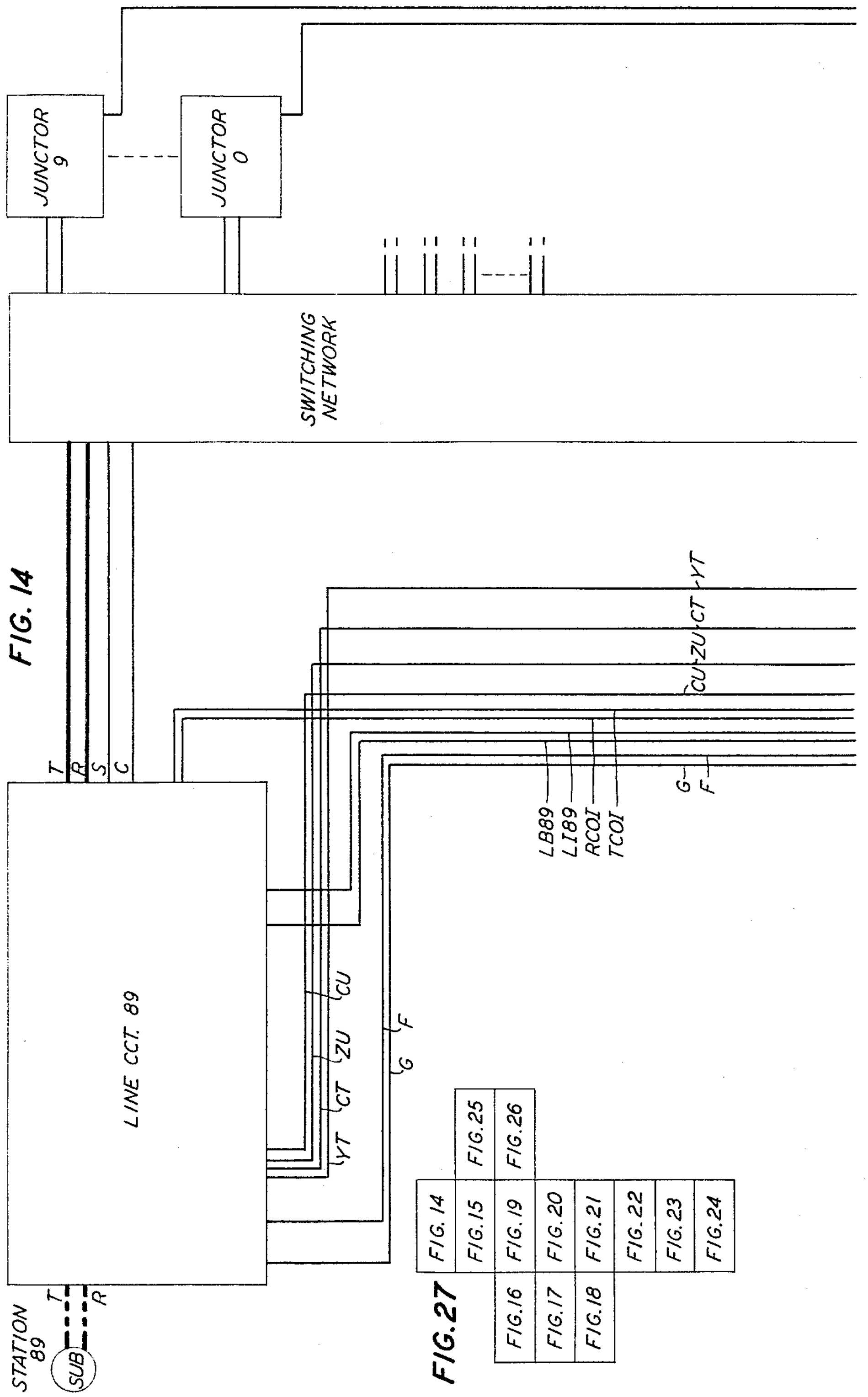

FIGS. 14 through 26, when arranged as shown on FIG. 27, together disclose the circuit details of an exemplary embodiment of the present invention.

GENERAL DESCRIPTION

Figure 1:
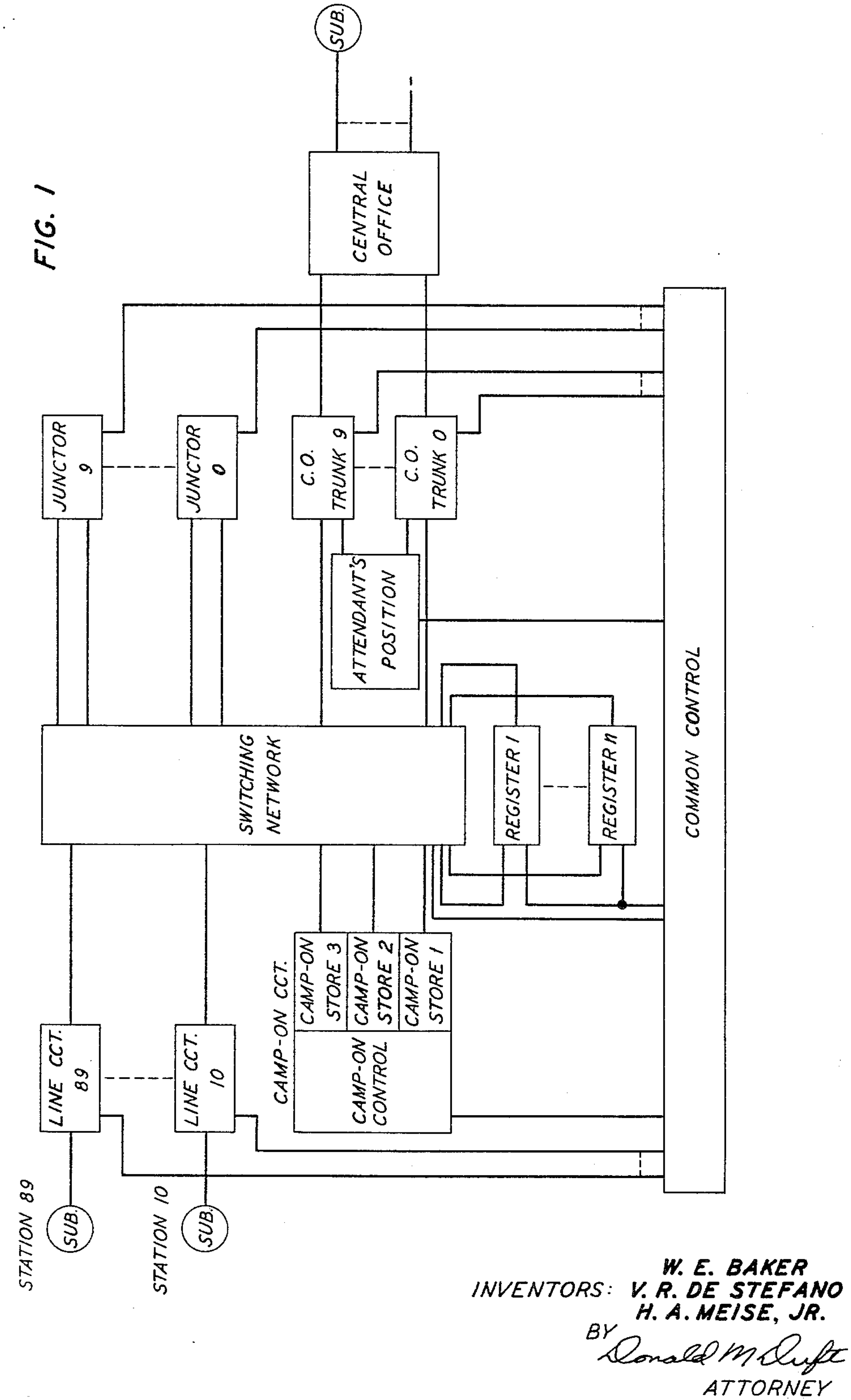

The camp-on circuit comprising the present invention is shown diagrammatically on FIG. 1 as comprising a portion of a PBX switching system. This system comprises a switching network having line circuits 10–89 and the camp-on circuit connected to its left-hand side, i.e., its line side, and having junctors 0–9 and central office trunks 0–9 connected to its right-hand side, i.e., its trunk side. A plurality of double-headed registers 1–*n* are also shown, each of which is connected to both sides of the network. The camp-on circuit comprises three camp-on stores, numbered 1, 2, and 3, together with a camp-on control. Each camp-on store has a connection to the switching network and each store is able to serve a camp-on call under control of the camp-on control portion of the camp-on circuit. The provision of three camp-on stores enables the camp-on circuit to provide camp-on service for three calls simultaneously. The remainder of the system comprises a common control circuit which is connected to each circuit of the system and which regulates and controls the operation of each circuit in order that they may operate in an ordered manner during the serving of calls. The switching network operates under control of the common control circuit in such a manner that it is able to interconnect any of its line side circuits with any of its trunk side circuits. The invention as shown on FIG. 1 also includes an attendant's position, which is connected to the central office trunks for performing the services required at the PBX in connection with incoming and outgoing central office calls.

Figure 2:
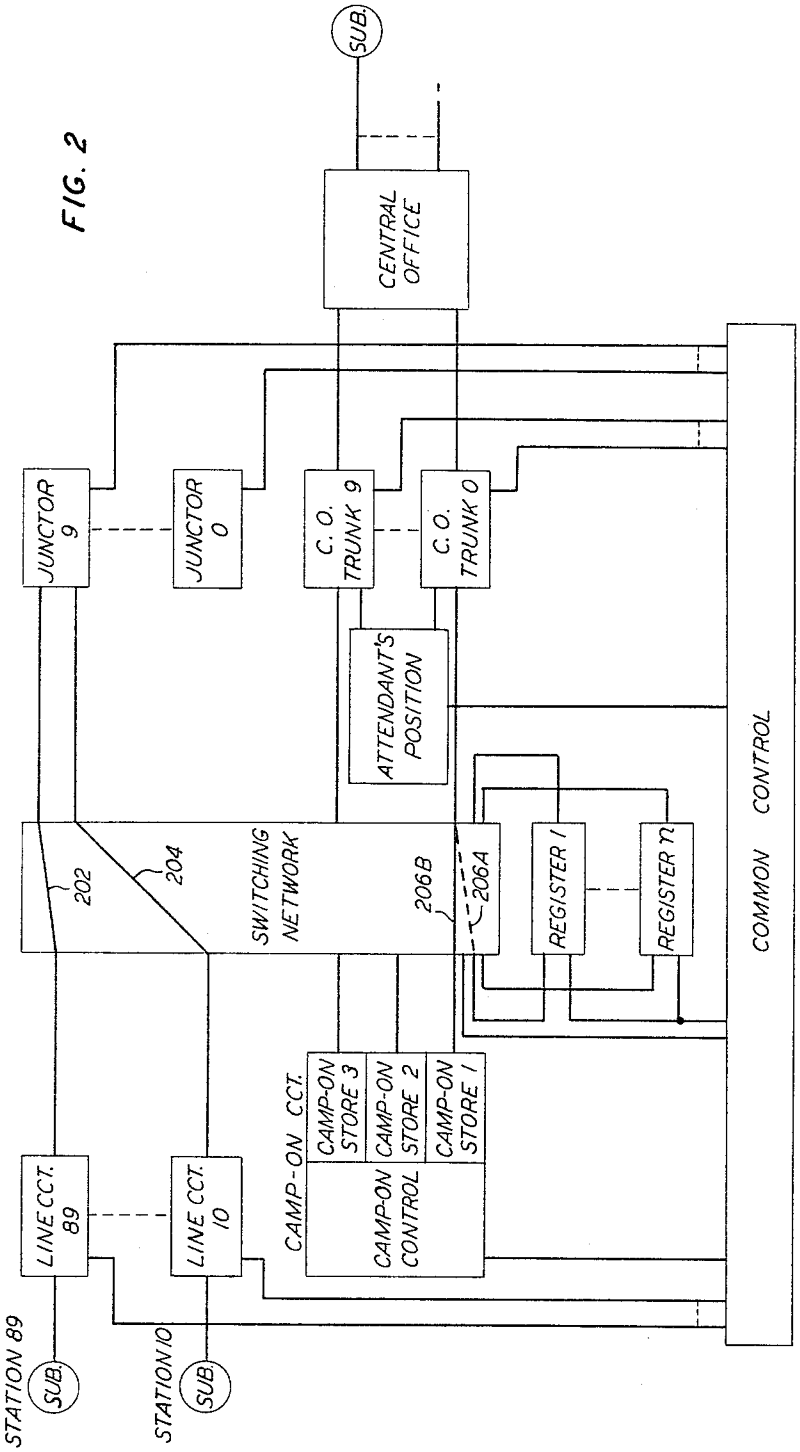

FIG. 2 discloses the manner in which certain of the circuits of FIG. 1 are initially interconnected when an incoming central office call is received which requires camp-on service because the called PBX extension is temporarily busy on another call. Let it be assumed that PBX extensions 10 and 89 are currently interconnected on a call at the time the PBX receives, over central office trunk 0, a call requesting a connection to PBX station 10. The connection between line circuits 10 and 89 includes network path 202, junctor 9, and network path 204. Network path 202 interconnects the network appearance of line circuit 89 with one of the network appearances of junctor 9, while network path 204 interconnects the network appearance of line circuit 10 with the other network appearance of junctor 9. The incoming central office call is received and connected to the attendant's position in the conventional manner. The attendant attempts to complete the call by first causing a network path to be established between central office trunk 0 and the line side appearance of a register, such as register 1, for example, and by then dialing the number of the requested PBX extension into the register. This temporary connection between the trunk and the register is shown as network path 206–A. Common control at this time attempts to complete the call. However, since the called line is busy, common control disconnects central office trunk 0 from the register and connects it to a camp-on circuit, if one is available.

Let it be assumed that the calling trunk is now connected, via network path 206B, to camp-on store 1. A trunk lamp at the attendant position is caused to wink and indicate the camped-on condition. If no camp-on store is available, busy tone is returned to the attendant. If the calling party chooses to camp on and wait for station 10 to become idle, the attendant removes herself from the connection by operating a position release key.

The interconnections shown on FIG. 2 persist so long as PBX stations 10 and 89 remain interconnected, and so long as the calling subscriber on central office trunk 0 waits for line 10 to become idle.

Figure 3:
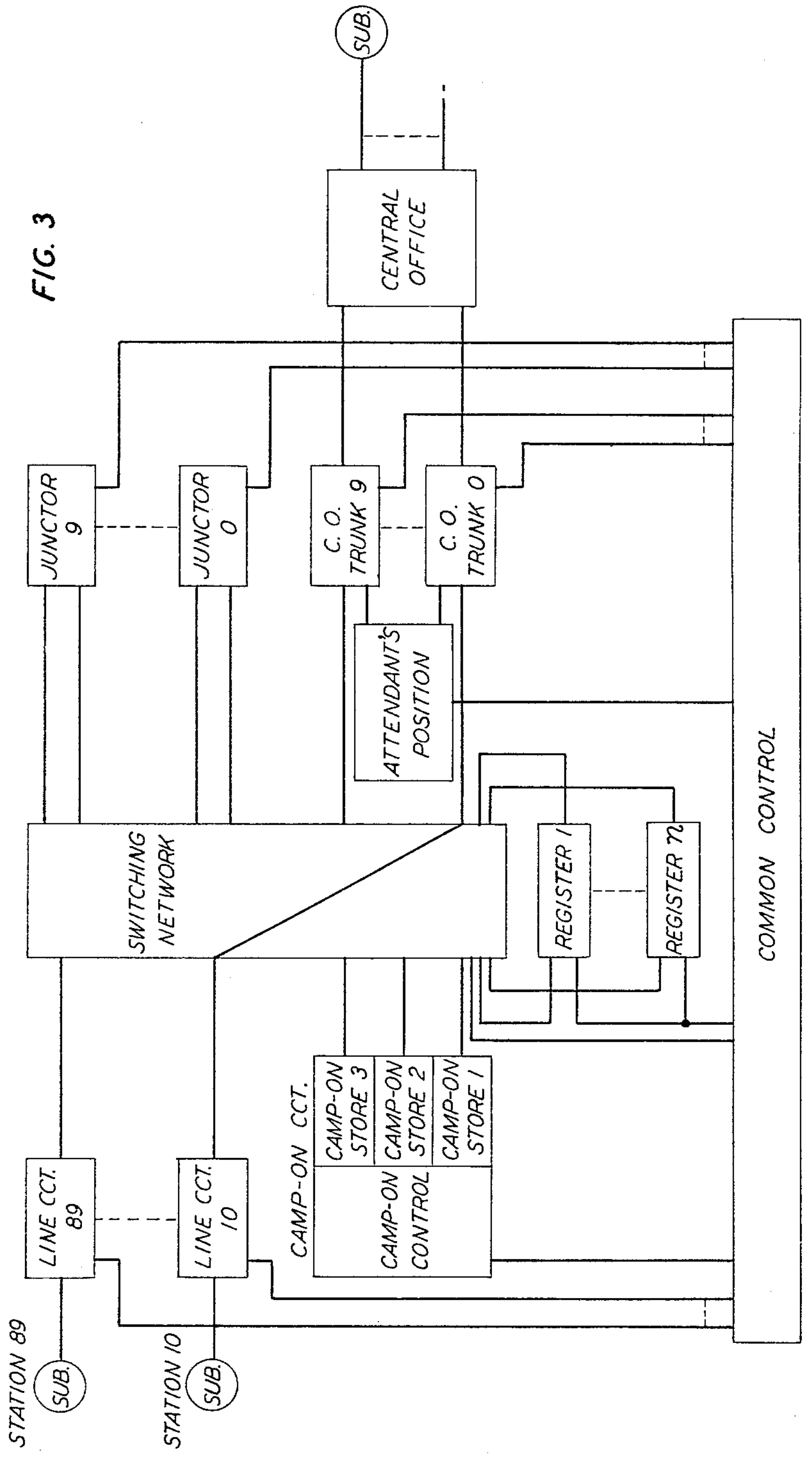

FIG. 3 discloses the manner in which the circuits of FIG. 1 are interconnected by the system, once the camped-on line becomes idle. The previous network path between stations 10 and 89 via junctor 9 is disconnected when stations 10 and 89 hang up upon the termination of their call. When this occurs, central office trunk 0 is disconnected from camp-on store 1 to which it was connected and a new network path is established between the network appearance of line circuit 10 and that of central office trunk 0.

Figure 4A:
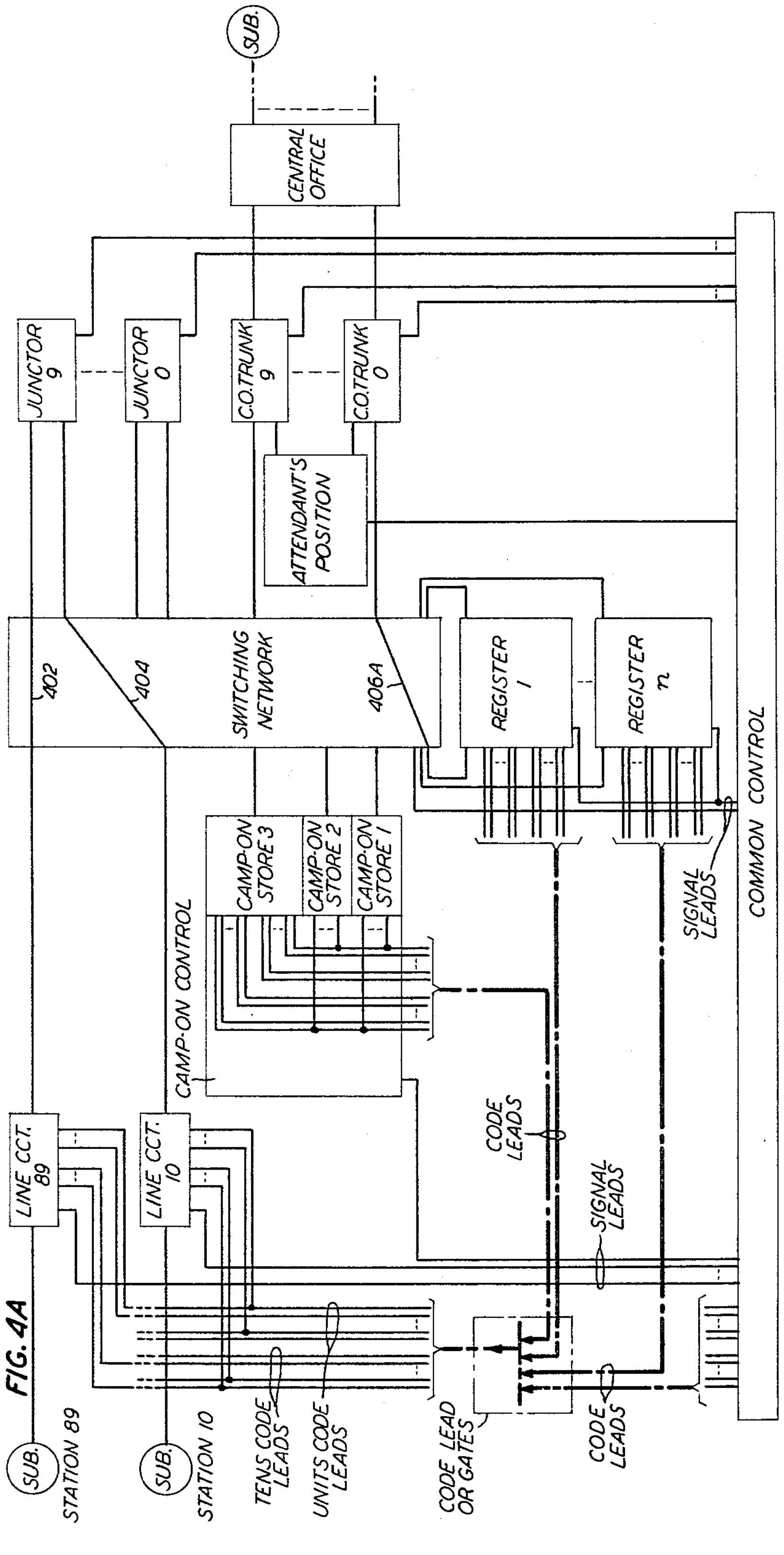

FIG. 4 diagrammatically discloses the various circuits comprising the system of the present invention in the same manner as do FIGS. 1, 2, and 3. However, FIG. 4 additionally discloses the code and signal leads in order that a clear understanding may be had of the manner in which digital information is interchanged between circuits during the serving of calls. The code leads are divided into a tens and a units group and interconnect the common control, the line circuits, the camp-on circuits, and the registers. Code lead OR gates are provided to isolate the output circuits of the registers, the common control, and the camp-on circuit. All code leads extend to the common control, to the camp-on circuit, and to the registers. However, each line circuit is connected to only four code leads, with each line circuit being connected to a combination of four code leads that is unique and different from that for any other line circuit. It has been previously mentioned that information is transmitted in combinational code from over the code leads in such a manner that each tens and each units digit is transmitted by grounding the pair of conductors in each group which represent the digit being transmitted.

The four code leads for each line circuit are connected to the base of its transistor gate so that the gate is held ON whenever at least one of its four code leads is at a positive potential. Conversely, the gate of a line circuit is turned OFF only when all of its four code leads are simultaneously grounded. It has been mentioned that all code leads are normally held at a positive potential when data is not being interchanged. This positive potential holds the gate ON in each line circuit. The grounding of a unique combination of four code leads for the transmission of tens and units digital information grounds all of four code leads for the line circuit whose assigned number matches that of the digits being transmitted and, in turn, causes the gate of the line circuit to turn OFF. The common control, by means of its interconnections with the line circuit via the signal leads, monitors the current conductive state of every line circuit gate to determine whether it is ON or OFF.

The following paragraphs describe the sequence in which data is transmitted via the code leads during the serving of the camp-on call previously described with reference to FIGS. 1, 2, and 3. Let it once again be assumed that PBX stations 10 and 89 are currently connected on a call, via network paths 402, 404, and junctor 9, and that subsequently an incoming call arrives on central office trunk 0 requesting a connection to PBX station 10. The attendant does not know at this time that station 10 is already busy, and therefore attempts to connect trunk 0 with station 10. The operator proceeds with this attempt by first depressing the keys at her position to cause the network to complete path 406A between the network appearance of central office trunk 0 with a line side network appearance of an idle register, such as for example, register 1. Once the register is connected, the operator dials the number of the requested PBX extension, i.e., 10, into the register via central office trunk 0 and the network path connection 406A.

Figure 4B:
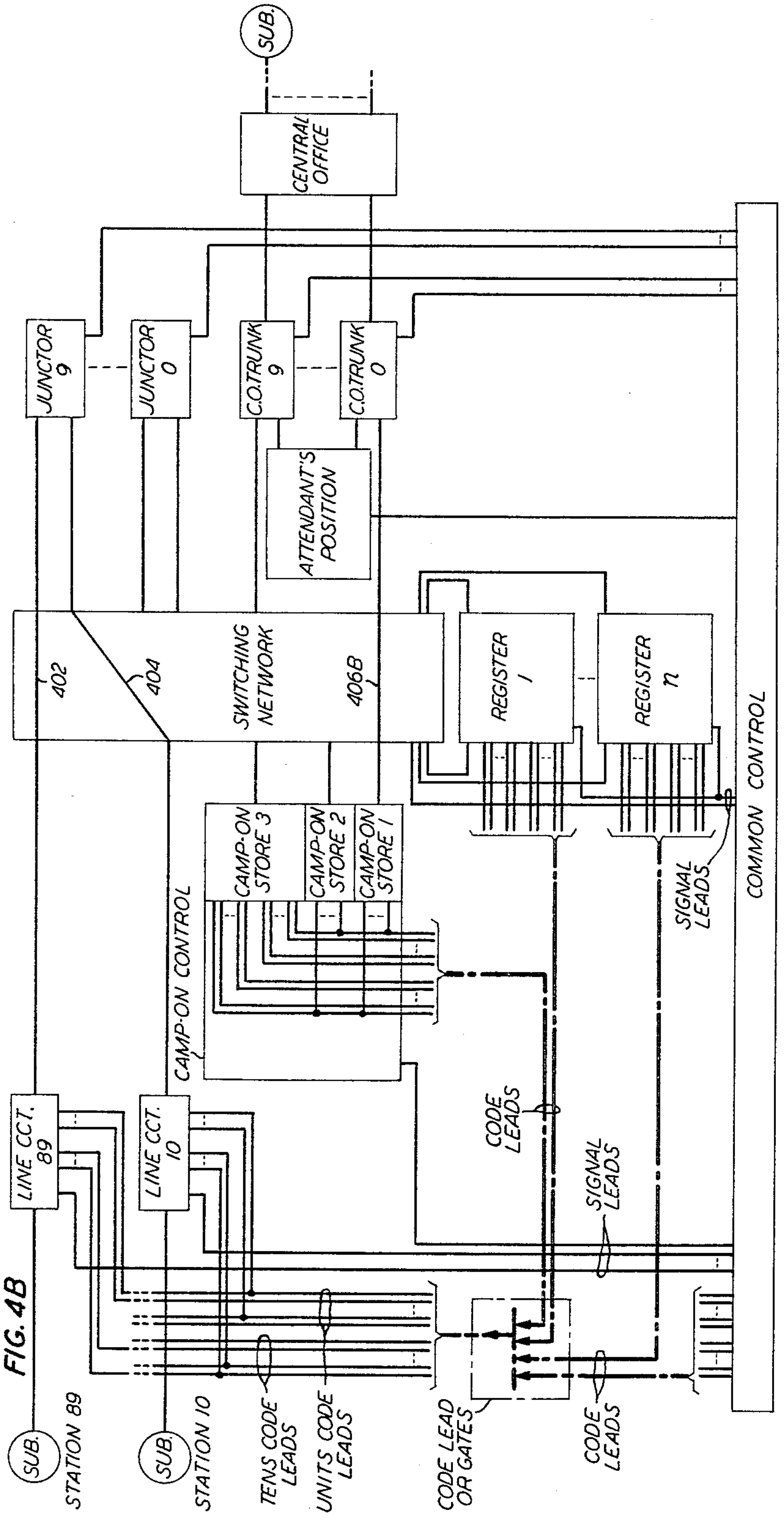
Figure 4C:
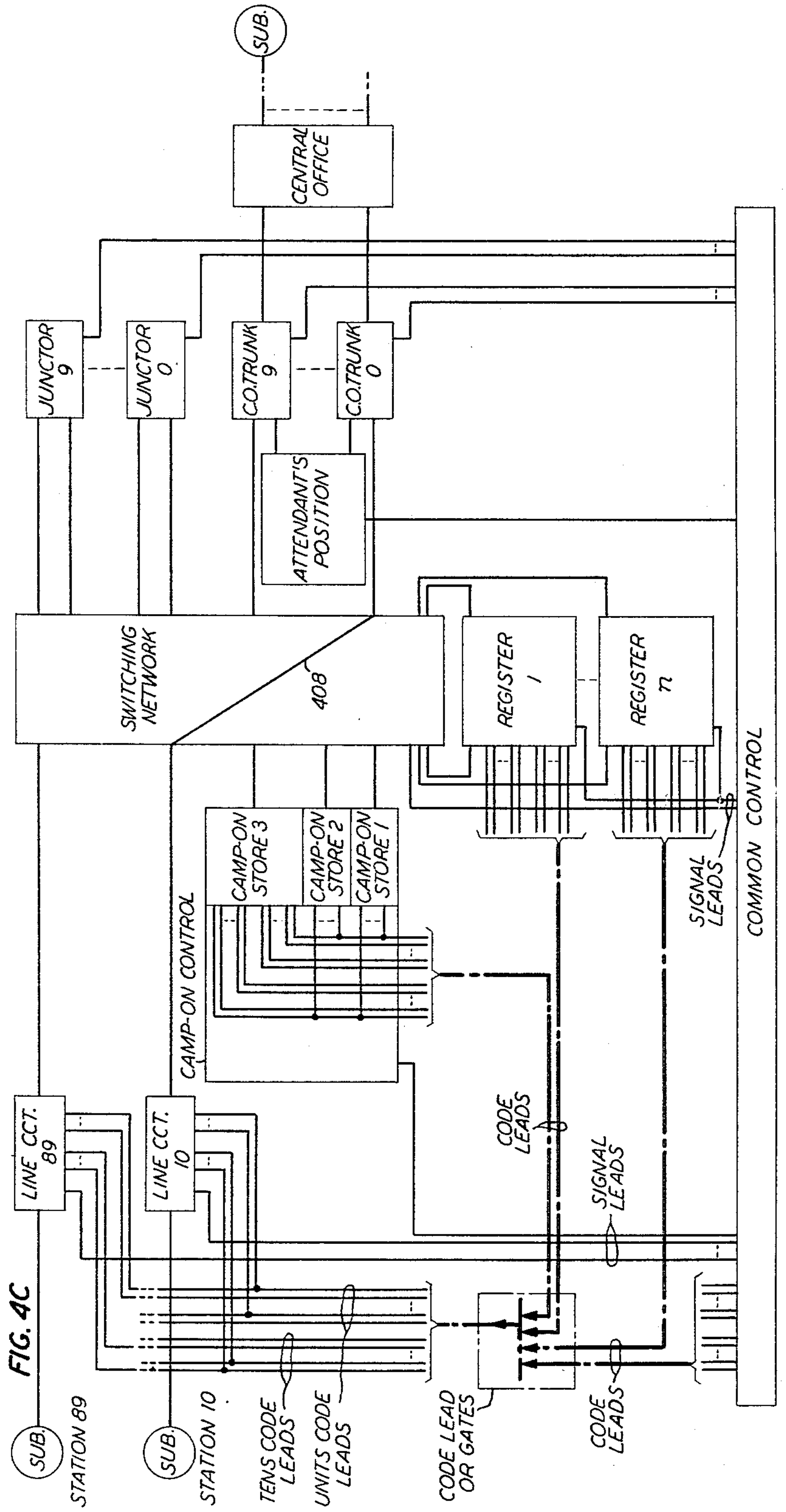

The register receives, counts, and stores the dialed digits. Following this, it gates out onto the code leads the digits 10 in combinational code form. This grounds the two code leads in the tens group which represent the digit 1 and similarly grounds the two leads in the units group which represent the digit 0. The grounding of these four code leads grounds all four code leads for line circuit 10 and causes its gate to turn OFF. The common control detects this turn-off and, by means of a circuit including the contacts of the cutoff relay in line circuit 10, determines that the call cannot be completed since line circuit 10 is busy. The common control then disconnects trunk 0 from the register and automatically connects it to an idle camp-on store, say camp-on store 1, for example. This is shown in FIG. 4B. No tone is returned to the attendant and this lack of tone indicates to her that the call is camped on. She informs the incoming caller of this and asks him whether he desires to camp on the line. If the calling party desires to camp on, the attendant depresses a position release key, which removes her from the connection and leaves central office trunk 0 connected to camp-on store 1 via network path 406B.

The first function that is performed within the camp-on store 1 is the entering into its data storage facilities of the number of the line that is to be camped on. This is accomplished in the manner described in the following paragraphs. The register is still held by the common control and at this time is still gating the digits 10 onto the code leads. This maintains the ground on the four code leads to which line circuit 10 is connected. The equipment within each camp-on store includes a counter which, whenever it is released after the serving of a camp-on call, is set to an arbitrarily selected number having a tens digit higher than that of any line circuit. This digit is assumed to be a 9 for the present disclosure. Subsequently, when store 1 is seized for the serving of the call, the number in its counter is gated out onto the code leads at the same time the line number 10 is gated out of the register.

The tens counter of camp-on store 1 gates out a 9 onto the code leads for the tens group at this time. This grounds the two code leads of the tens group which represent a 9 and, at the same time, applies a positive potential to every other lead of the same group. Of the leads to which a positive potential is applied at this time, at least one of them must, of necessity, be connected to line circuit 10 since its tens digit is a 1 rather than a 9. Thus, even though the register at this time grounds the two tens group code leads connected to line circuit 10, the positive potential applied to at least one of these same two leads by the camp-on store counter overcomes the ground from the register and causes the gate of line circuit 10 to turn ON. This turn-on is detected by the common control which signals the camp-on circuit that the number stored in the register does not match that in the camp-on store counter.

The input of the camp-on store counter is connected via a controllable gate to a source of pulses. The pulse source is effective when the gate is closed to advance the counter one operative position for each pulse generated. The gate is controlled by the common control circuit and the camp-on control cooperating together. They close the gate at this time and cause the pulses to be applied to the input of the counter. The gate remains closed and the pulses remain applied to the counter so long as its setting does not match that of the register. The camp-on store counter now advances from position to position as successive pulses are received and, in so doing, gates out onto the code leads potentials signifying its position following the reception of each pulse. The no-match indication between the register and the camp-on counter persists as long as the number in the counter does not match that in the register. Also, so long as this no-match indication persists, the gate of line circuit 10 is held ON by the positive potential applied to the code leads by the camp-on store counter. Finally, as the camp-on store counter continues to advance, it ultimately reaches a position in which its setting matches that of the camped-on line number stored in the register. At this time, both the register and the camp-on store counter ground the same four code leads and cause the gate of line circuit 10 to turn OFF. This turn-off is detected by the common control which, in turn, signals the camp-on circuit to disconnect the camp-on store counter from the pulse source and thereby lock it in its operative position 10. The register is then released from the call once the number 10 is finally read into camp-on store 1.

It has priorly been mentioned how a comparison is made between the dialed number on every subsequent call and the line registered in a camp-on store in order to ensure that a camped-on call will have first priority in reaching its camped-on line when it becomes idle. This comparison is accomplished by causing the register and the camp-on store to gate their numbers onto the code leads and by then utilizing the gate of the camped-on line circuit to indicate whether a match or a no-match condition exists. Such a comparison operation is accomplished with respect to the presently described camp-on call by gating from camp-on store 1 the number of line 10 onto the code leads and by simultaneously gating out from the register the number dialed for any newly initiated call. If the two numbers match, all four code leads for line circuit 10 will be grounded and will thereby turn OFF its gate in the manner before described. This turn-off is detected by the common control, which, in response thereto, causes a busy tone to be applied to the calling circuit in the same manner as if a line number had been dialed that was busy but not camped on. On the other hand, if the number gated onto the code leads by the register does not match the digits 10 gated onto the code leads by camp-on store 1, at least one of the code leads for line circuit 10 will be supplied with a positive potential which will hold its gate ON. This is detected by the common control, which then permit the subsequently initiated call to proceed to completion in the normal manner.

It has been priorly explained how the camp-on circuit repeatedly tests the current condition of each camped-on line in order that it may connect a calling incoming trunk to the camped-on line when it becomes idle. The following paragraphs describe the manner in which this operation is performed with reference to FIG. 4B. The circuitry internal to the camp-on circuit includes a closed loop three-position counter having a position indivdual to and associated with each camp-on store. The counter operates in such a manner that it advances once each 500 milliseconds, from position to position, and for the interval of time it is in each position, it causes the number currently registered in its associated camp-on store to be gated onto the code leads if the store is serving a call. This grounds the four code leads for the camped-on line circuit and causes its gate to turn OFF. The turn-off of the gate together with a circuit controlled by contacts of the cutoff relay within the line circuit causes a signal to be sent back to the common control indicating whether the camped-on line is still busy or idle. If the common control receives a busy indication, it transmits a busy signal to the camp-on circuit which advances its three-position counter to its next position, in which it then causes the line number for a call being served by the next camp-on store to be gated out onto the code leads and tested for a busy or idle condition in the same manner. The camp-on circuit continues to advance in this manner once every 500 milliseconds, and thus it continues to make repeated busy-idle tests for every camp-on call being served. If the common control receives a signal back indicating that a line circuit is idle during a test, it informs the camp-on circuit of this fact, which then causes the camped-on line to be interconnected with the calling trunk.

With reference to the present call, the digits 10 are gated out from camp-on store 1 each time the three-position counter advances to its position associated with camp-on store 1. The four code leads associated with line circuit 10 are grounded during each test and the transistor gate of line circuit 10 turns OFF each time all of its code leads are grounded. The cutoff relay of a line circuit is operated whenever the line circuit is busy and is released whenever its line circuit is idle. The contacts of this cutoff relay are connected to the transistor gate of the line circuit in such a manner that the common control receives either a busy or idle indication by means of contacts on the cutoff relay each time the gat turns OFF. If line circuit 10 is busy on a test, the common control signals the camp-on circuit to this effect, which, in turn, causes its three-position counter to advance to the next position in which it will make a similar test on any call camp-on store 2 may be currently serving. If line circuit 10 is found idle when tested, the common control receives an idle signal and, in turn, informs the camp-on circuit that the tested line is idle. The camp-on circuit and the common control, once an idle signal is received during a busy test, cooperate in the manner subsequently described, to disconnect incoming trunk 0 from camp-on store 1 and to connect it to line circuit 10. This connection includes network path 408 shown on FIG. 4C.

Once a connection between a central office trunk and a camped-on line is completed, both camp-on store 1 and the common control are released for the serving of other calls. For the reasons already described, a tens digit of 9 is entered into the tens counter of camp-on store 1 in connection with its release operation.

*Pulse counters—FIGS. 5, 6, 7, and 8*

Figure 5:
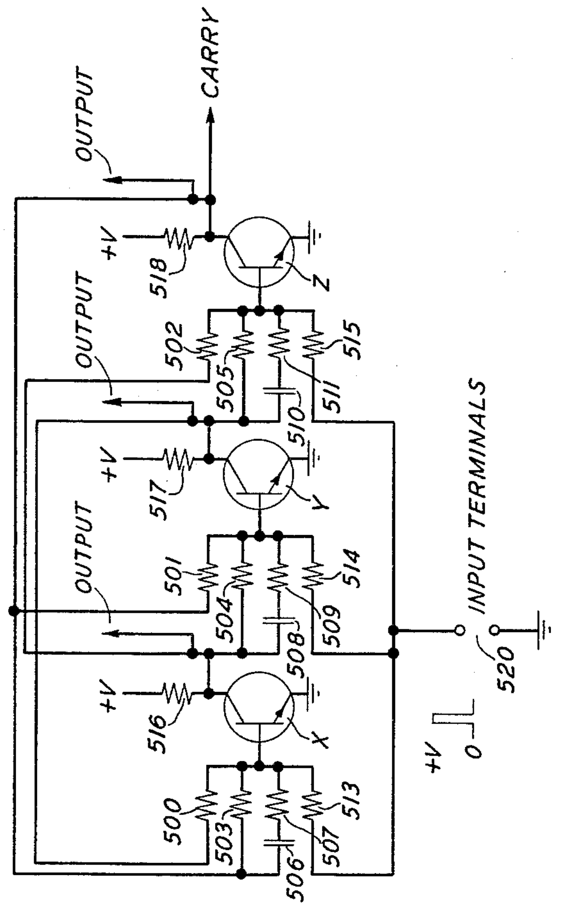

FIG. 5 discloses the details of the circuit that is used as the basic building block of the counting circuits of the present invention. The present drawing has been simplified by disclosing the counters in diagrammatic form, and this discussion is presented in order that their circuit details and operation may be fully understood. The circuit of FIG. 5 has three positions, X, Y, and Z, each of which has a transistor, a capacitor, and five resistors. Each position is directly coupled to every other position via the resistors 500 through 505. Each position is also coupled to the next succeeding position by an RC combination, such as elements 506 and 507 for stage X. The input pulses are applied to the circuit by means of input terminal 520 and are, in turn, transmitted to the bases of the three transistors by means of resistors 513, 514, and 515.

There is only one possible mode of operation for this circuit, i.e., one transistor is OFF while all of the remaining transistors are ON. The OFF transistor holds the other transistors ON, and vice versa. The circuit is stable in any one of its three positions. The circuit is considered, for the purposes of this specification, to be in the position currently having the OFF transistor. Thus, for example, if transistor X is OFF while transistors Y and Z are ON, the circuit may be said to be in position X. The output of each position is taken directly from the collector of its associated transistor. A potential of approximately +V is applied to the output of each position whose transistor is in an OFF condition, while a potential approximating that of ground is applied to the output of the position whose transistor is currently ON.

A change of state for the circuit of FIG. 5 occurs as follows: A positive-going input pulse on terminal 520 turns ON the transistor that currently is OFF. When the input pulse returns to its normal or 0 volts condition, the succeeding transistor turns OFF. The proper sequence is assured because the capacitor in the interconnecting network has stored a charge built up by the preceding transistor turning ON. This serves to inhibit the base current in the succeeding transistor long enough to turn it OFF when the input pulse returns to normal. For example, assume that transistor X is OFF and that transistors Y and Z are ON. In this condition, the left-hand plate of capacitor 508 interconnecting transistors X and Y is positive while the right-hand plate of the same capacitor is at ground potential and is therefore negative with respect to its left-hand plate. A positive-going pulse is then applied to terminal 520 and its drives all three transistors ON for the pulse duration. The pulse duration is short, capacitor 508 does not have time to discharge, and it remains charged at essentially its original potential. When the input pulse terminates, one transistor must turn OFF because this is the only stable state of the circuit. Transistor Y turns OFF at this time since the turn-on of transistor X lowers the left-hand plate of capacitor 508 to approximately ground potential. The right-hand plate of the same capacitor is negative with respect to the left-hand plate, and therefore it holds the base of transistor Y negative for the capacitor discharge time. The remaining transistors, X and Z, stay ON when the pulse ends, due to their direct coupling to the collector of the transistor Y which is now at a +V potential. The ON condition of transistors X and Z lowers the potential on their collectors to ground. The direct resistive coupling between the collectors of these transistors and the base of transistor Y, in turn, grounds the base of transistor Y thereby holding it OFF.

The OFF transistor is propagated along the chain one position for each positive-going input impulse received. A carry pulse may be obtained from the collector of any transistor, such as transistor Z as shown, and applied to the corresponding input terminal of another counter chain to provide a plural stage counter.

The counter shown on FIG. 5 may be expanded to have as many counter stages as may be desired. The principles of operation of the expanded counter will be the same as just described for the three-stage counter in the preceding paragraphs, namely, the transistor of one stage will be in an OFF condition while the transistor in each of the remaining stages will be in an ON condition. The expanded counter will also respond to the reception of input pulses in a similar manner so that the counter stage having the OFF transistor will be propagated down the chain one position for each received pulse.

Figure 6:
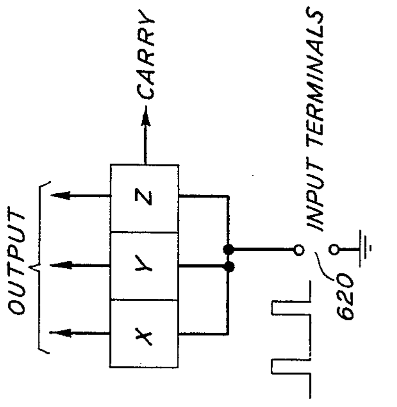

FIG. 6 discloses a diagrammatic representation of the counter circuit of FIG. 5.

FIG. 7 discloses a plural stage counter having positions X, Y, and Z in a first stage and positions A, B, C, D for a second stage, with the carry signal between stages being provided from the output of the Z position of the first stage. A differentiator comprising capacitor 700 is in the carry circuit in order to differentiate the steady-stage D-C signals on the Z output of the first stage. Diode 701 is provided to absorb the negative-going differential pulses.

The stepping pulses for the two-stage counter are applied to the in put terminal 720 and, in response thereto, the XYZ counter advances one position per pulse and applies a positive carry signal to the ABCD stage each time the Z position goes from an ON to an OFF condition. The carry signal is differentiated and applied as a positive pulse to the 707 input terminal of the ABCD counter section which advances its operative position one step for each carry pulse received.

The XYZ and ABCD counter stages, when interconnected as shown on FIG. 7, together comprises a counter having a reset position and ten counting positions for counting the digits 0 through 9 in combinational code form. The combinational code used in the present invention is shown on FIG. 8, and it may be seen from a study of this figure that each position of the counter is represented by a unique combination of two-counter sections in an OFF condition. Thus, for example, the OFF condition of counter sections X and D represent the digit 0, the OFF condition of counter sections Z and A represent the digit 3, while the OFF condition of sections Z and D represent the R (reset) position.

A positive-going reset pulse applied to terminal 706 resets both counter stages to their reset (R) position in accordance with the code of FIG. 8. The reset pulse is applied to sections X, Y, and ABC, through diodes 705 and 703, respectively, and is isolated from the Z and D sections by diodes 704 and 702, respectively. At this time, the XY and ABC sections are conducting while the Z and D sections are OFF.

*Logic circuits—FIGS. 9, 10, 11, 12, and 13*

The register makes extensive use of transistor-resistor logic circuits in which a single transistor stage is used as an inverter, an inverting AND gate, or an inverting OR gate, depending upon the nature of the input signals applied thereto and the function to be performed by the stage. FIG. 9 discloses details of such a circuit which comprises a single transistor, a collector-resistor RC and a plurality of base input resistors, R1–R*n*, of which there is one for each input to the stage. The circuit of FIG. 9 is basically a single-stage inverter since a positive-going signal applied to the base appears as a negative-going signal at the collector, and vice versa.

The stage may be used as an inverting OR gate by leaving the circuit normally cut OFF, i.e., all inputs at a ground potential. In this case, a positive-going signal applied to one or more input leads will turn the transistor ON and provide a negative-going signal on the collector. The stage also may be used as an inverting AND gate, in which case the transistor is normally held ON by a positive signal applied to one or more of its input leads. The AND condition of the circuit is achieved by a LOW potential on all input leads simultaneously, at which time the transistor turns OFF and produces a positive-going signal at its output.

The circuit of FIG. 9 is often used in the circuit of the present invention as an AND gate in such a manner that one of its inputs may be considered as a signal input while the remaining ones of its inputs may be considered as clamping inputs which are effective to either enable or disable the AND gate and thereby determine whether the signal on the signal input is to pass through the gate to its output. When it is desired to disable or block the gate in order to prevent any input signals from passing through to the output, one or more of the clamping inputs are elevated to a positive potential to saturate to the transistor and thereby prevent the potential of the signal input conductor from exerting any influence on the conductive condition of the transistor. Conversely, all of the clamping input conductors are grounded when it is desired to enable or turn ON the gate in order to let signals on the input signal conductor pass therethrough. This, in turn, places the conductive condition of the transistor solely under control of its signal input conductor, and, as a result, the signals appearing on this conductor can then pass through the gate and appear at its output in inverted form.

FIG. 10 discloses the symbol utilized when the circuit of FIG. 9 is used as an inverting OR gate, while FIG. 11 discloses the symbol utilized when the circuit of FIG. 9 is used as an inverting AND gate.

FIGS. 11 and 12 disclose the symbols used to represent noninverting OR and AND gates, respectively, in the system of the present invention.

DETAILED DESCRIPTION

*Description of FIGS. 14 through 26*

Figure 15:
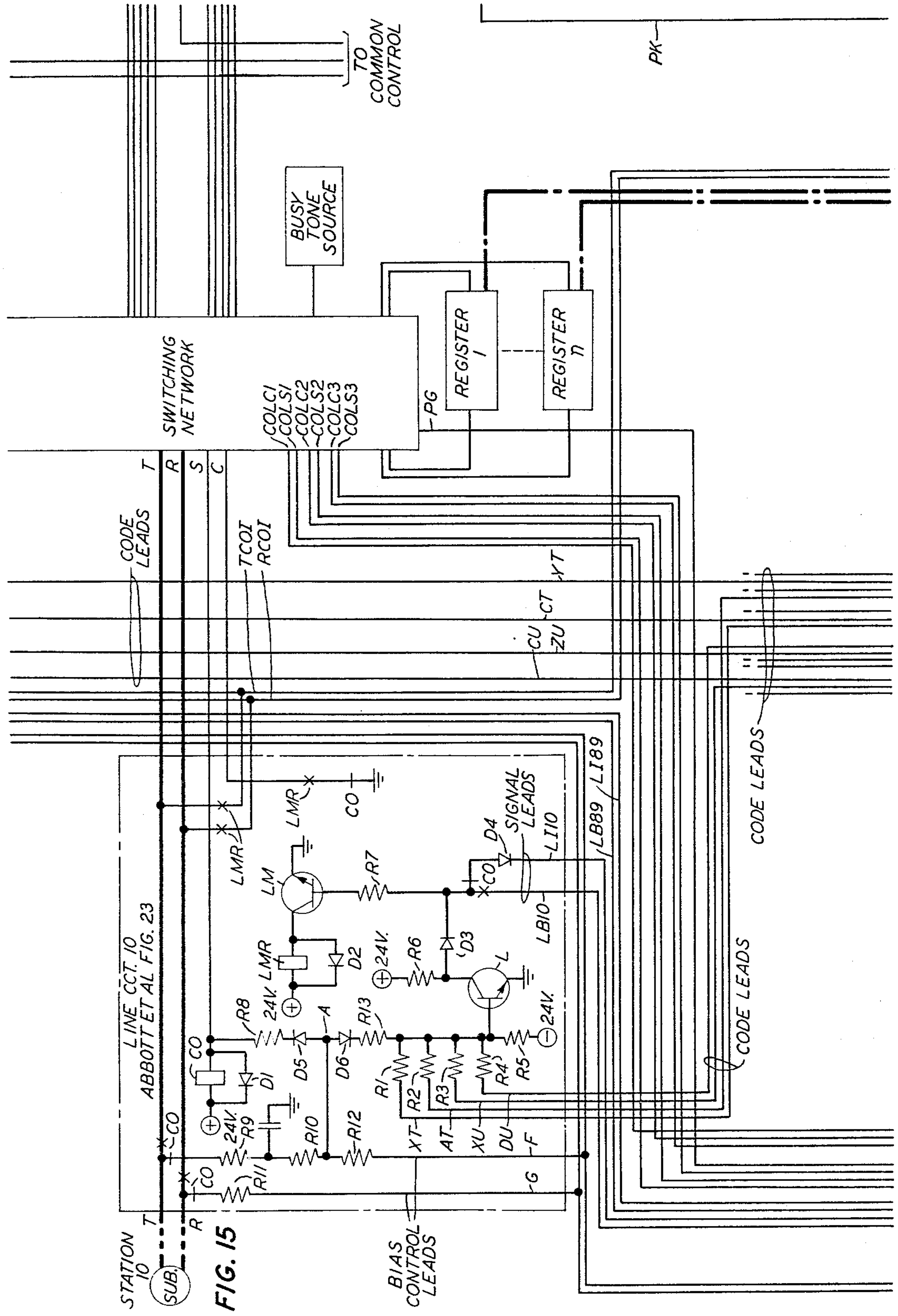

The circuit details of the present invention are shown on FIGS. 14 through 26 of the drawing. FIGS. 14 and 15 together disclose a switching network, an attendant position, together with the various circuits which connect to the network and which, in turn, are interconnected by it during the serving of calls. These circuits include line circuits, registers, central office trunks, and junctors. Eighty line circuits, numbered 10 through 89, are disclosed, with line circuit 10 being shown in detail and with the rest being shown diagrammatically. The switching network, the registers, and the junctors are shown only diagrammatically in order to simplify an understanding of the present invention. These circuits are shown in detail in the application of H. H. Abbott et al., Ser. No. 386,589, filed July 31, 1964, which is incorporated by reference in the present specification to the same extent as if fully disclosed herein. The dashes extending outward from the right side of the switching network on FIG. 14 diagrammatically represent certain trunk side circuits (outgoing trunks and attendant trunks) disclosed in Abbott et al. which have been omitted from the present disclosure since they are not involved in the serving of camp-on calls. Their omission minimizes the complexity of the drawings and thereby facilitates an understanding of the invention. Only those circuit details for the attendant's position and the central office trunk are shown as are necessary for an understanding of the operation of the present invention.

The common control circuit, as disclosed in Abbott et al., is equipped to serve primarily intra-PBX and outgoing calls. FIGS. 16 through 19 together disclose certain portions of the Abbott et al. common control circuit together with the manner in which it must be modified to enable the resultant circuit to control incoming calls requiring camp-on service as well as the type of calls described in Abbott et al. The circuit elements within the designated rectangles on FIGS. 16 through 19 represent the Abbott et al. common control circuit elements which require modification for camp-on service. Each rectangle is designated with an indication of the Abbott et al. figure number on which the circuit element may be found. The circuit elements on these figures which are not enclosed within rectangles represent the changes which must be incorporated into the Abbott et al. common control circuit to equip it for camp-on service. Thus, referring to the BT gate on FIG. 18, for example, this gate is shown on FIG. 30 of the Abbott et al. specification and is shown on FIG. 18 of the present drawing in order to illustrate the changes required to the Abbott et al. common control circuit to equip it for camp-on service.

Figure 20:
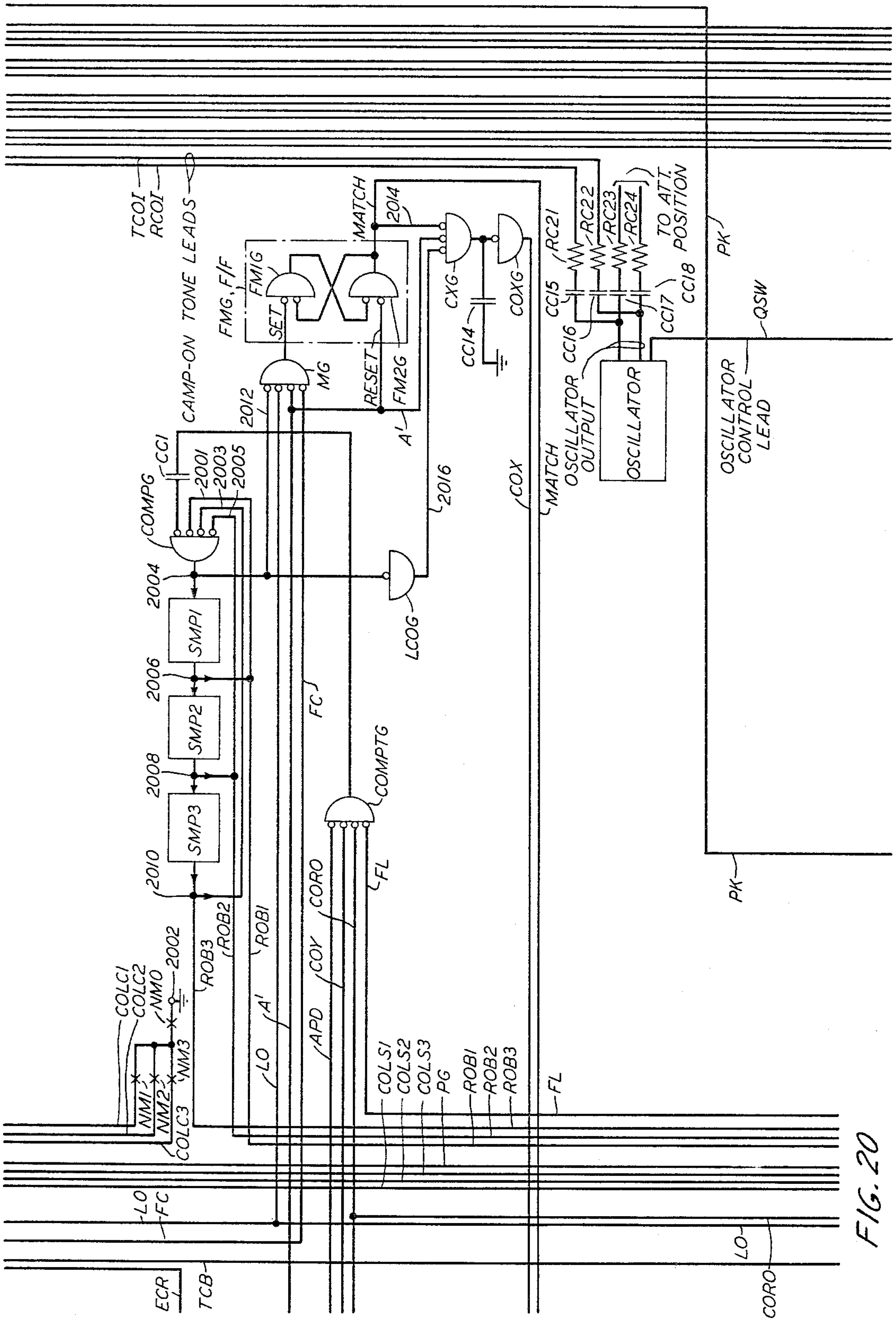
Figure 21:
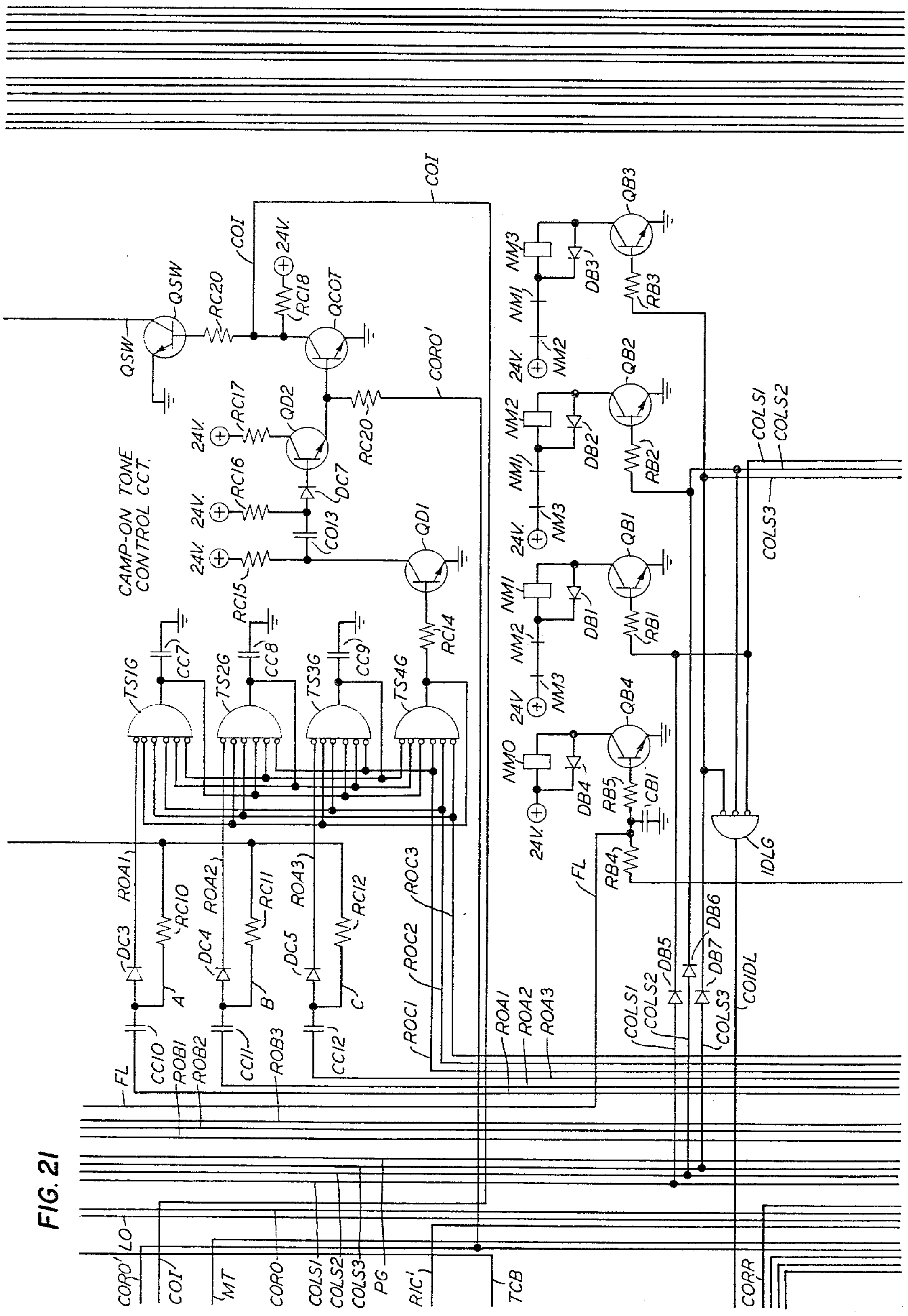
Figure 22:
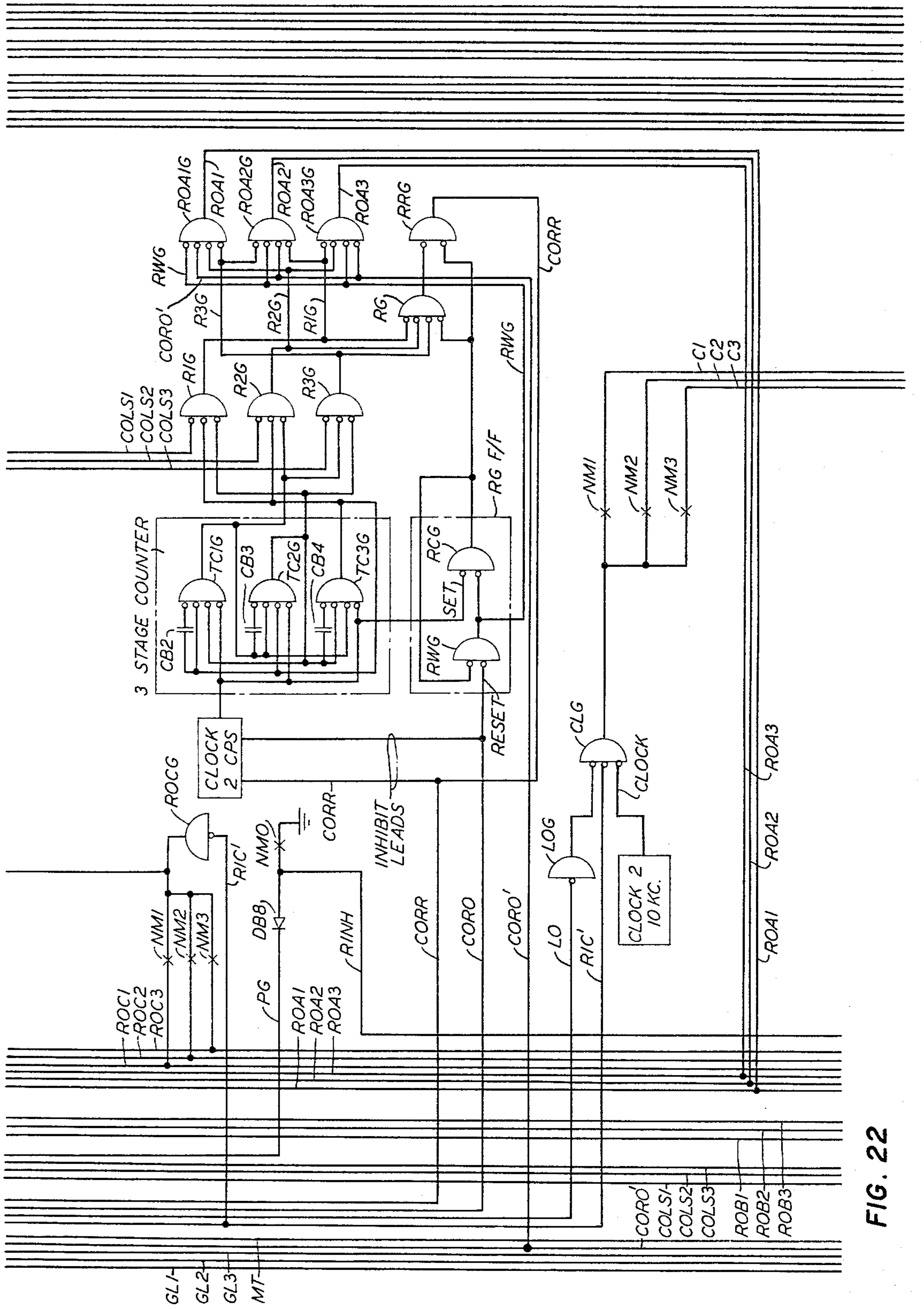
Figure 23:
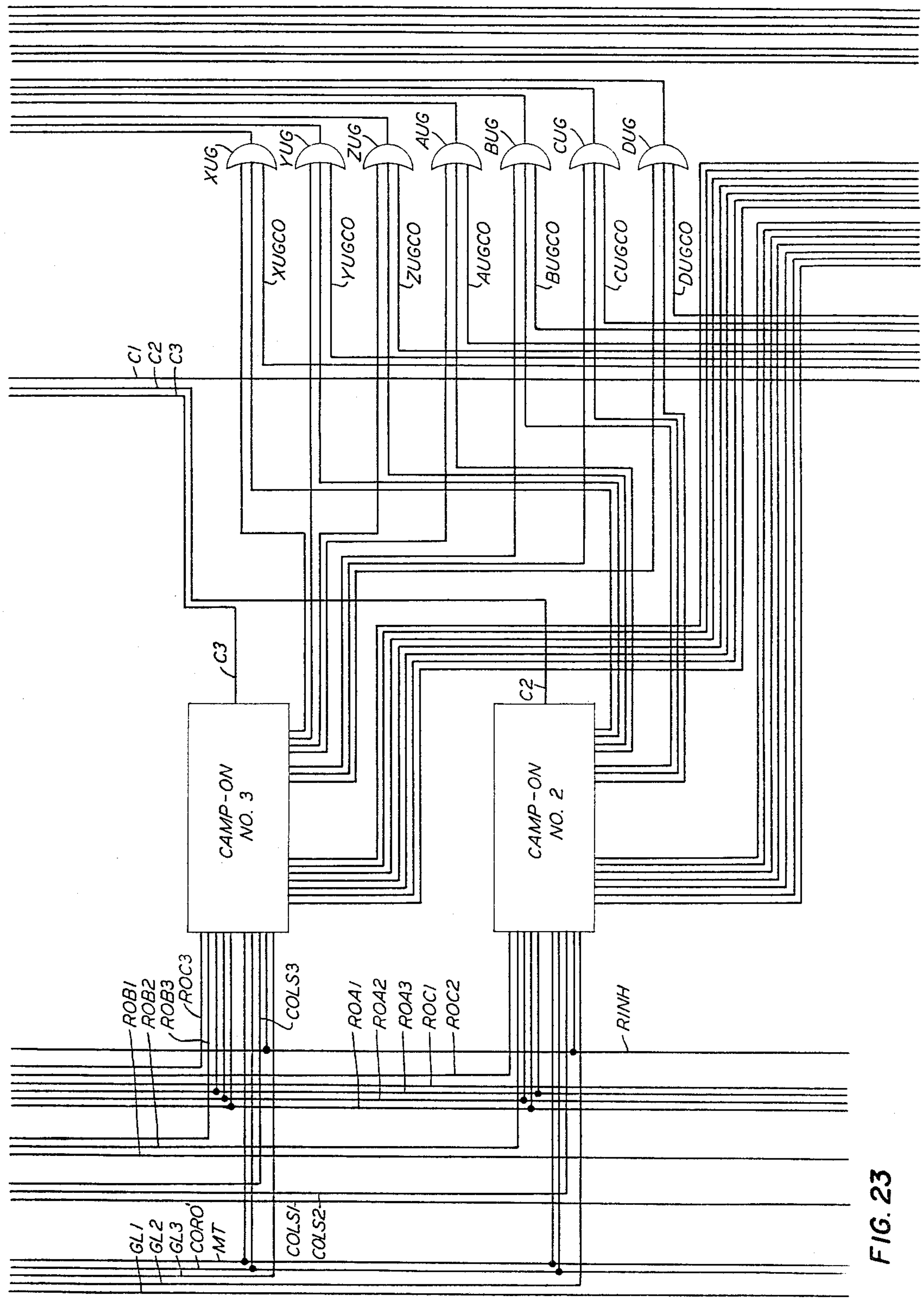
Figure 24:
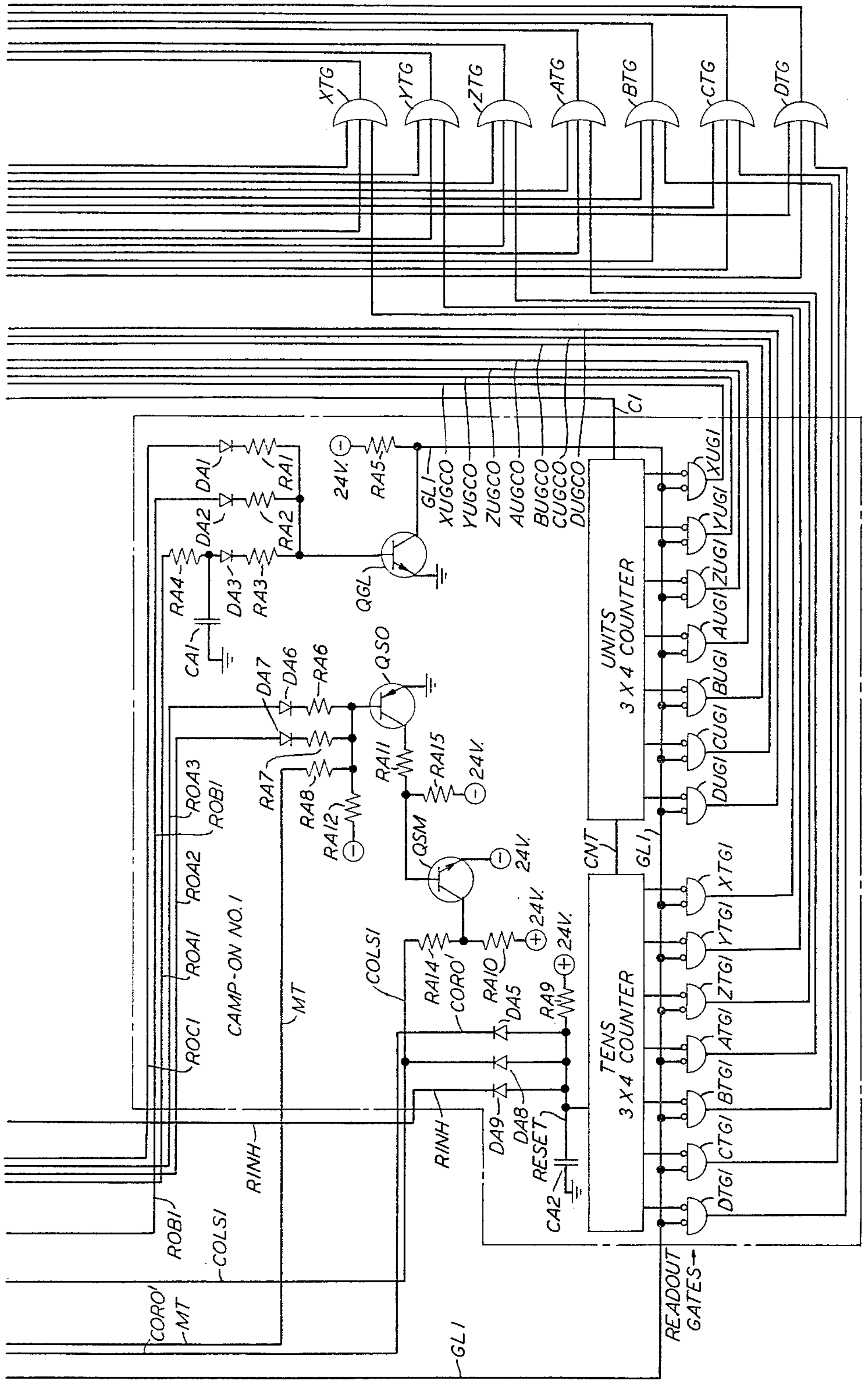
Figure 25:
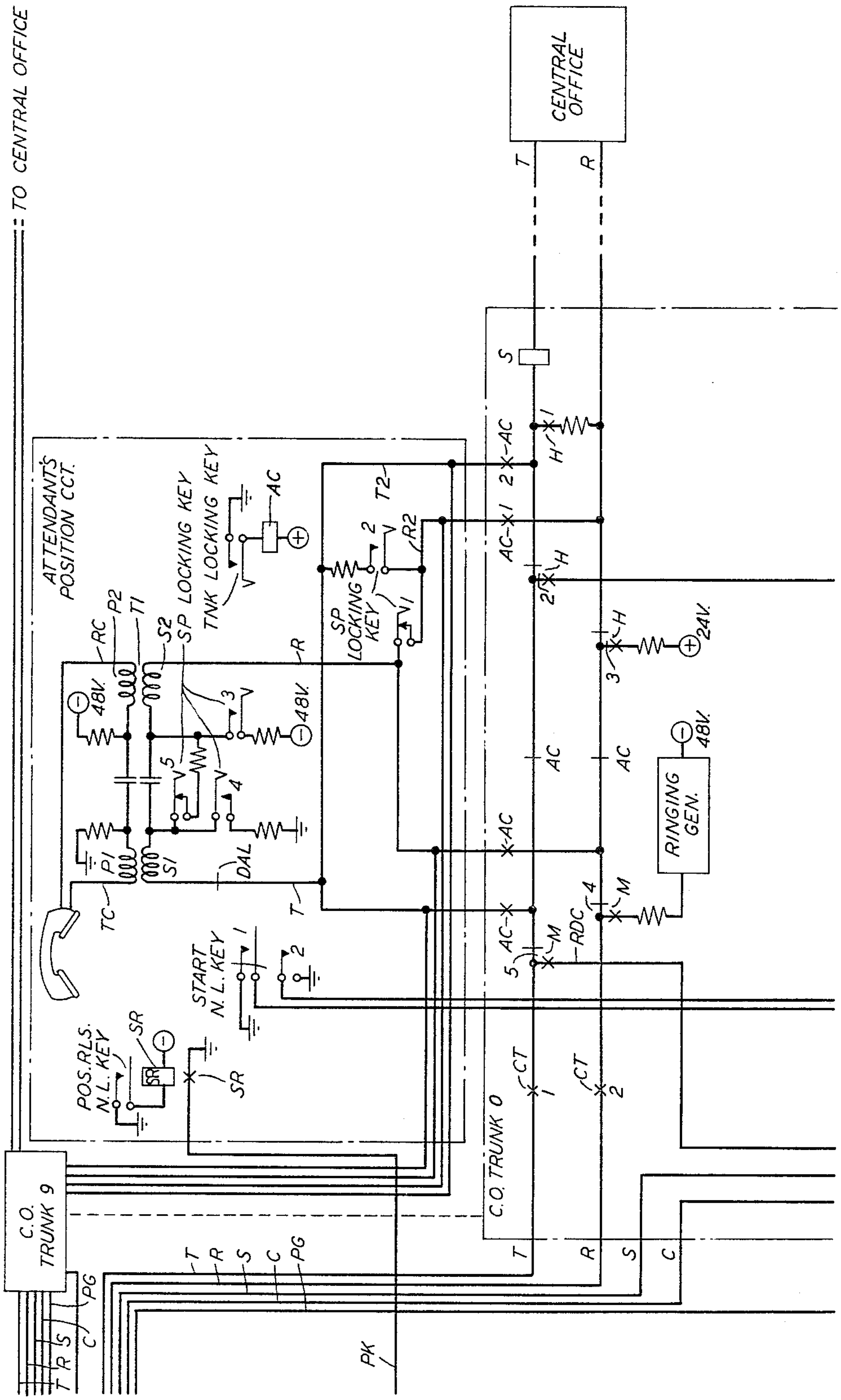
Figure 26:
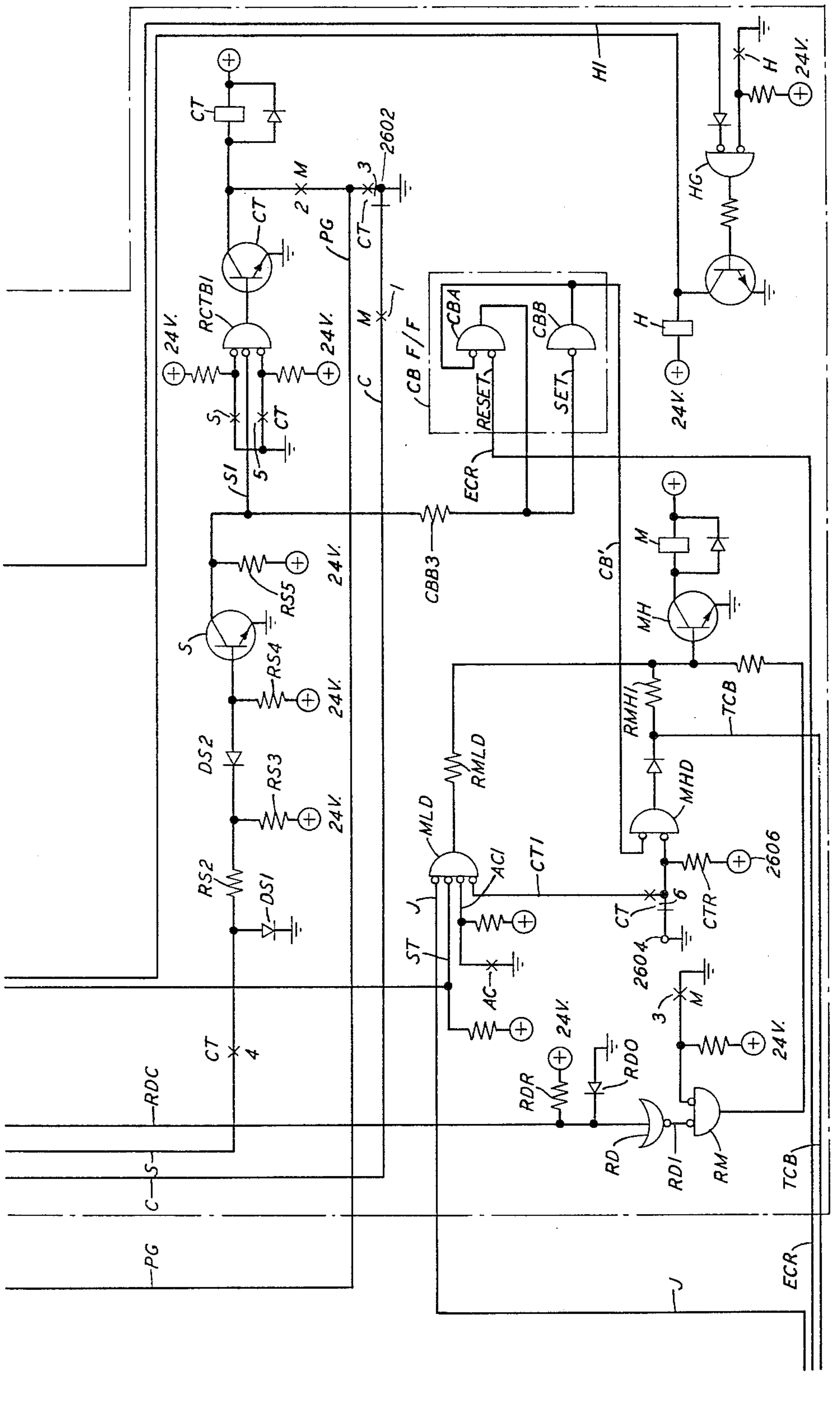

FIGS. 20, 21, and 22 disclose the common portion of the camp-on circuit. FIGS. 23 and 24 together disclose three camp-on stores, with camp-on store 1 being shown in detail and with the other two being shown only diagrammatically. FIGS. 25 and 26 together disclose incoming trunks and an attendant position together with the details thereof that are necessary for an understanding of the invention.

*Line circuits and code leads*

FIGS. 14 and 15 together disclose a plurality of PBX subscriber subsets 10 through 89, with each subset being connected over a pair of tip and ring conductors T and R to a correspondingly numbered PBX line circuit. Line circuit 10 is shown in detail while the remaining line circuits, including 89, are shown diagrammatically except for the connections extending from each line circuit to other circuits of the system. Each line circuit comprises a cutoff relay CO, a relay LMR, two transistors, L and LM, as well as other circuit elements comprising resistors, capacitors, and diodes as shown. The circuit details of line circuits 11 through 89 are identical to that of line circuit 10.

Each line circuit is connected to the switching network by means of four conductors: T, R, S, and C. The T, R, and S conductors are the conventional tip, ring, and sleeve conductors. The C conductor is a marking conductor and is supplied with a ground potential when it is desired to identify the line circuit to the network in order that the network may interconnect the line circuit with a circuit connected to the right-hand side of the switching network.

Each line circuit is also connected to the common control circuit by a plurality of conductors, with the conductors for line circuit 10 being designated G, F, XT, AT, XU, DU, LB10, and LI10. Conductors G and F are common to all line circuits and are provided to enable the common control to regulate the conductive condition of the L transistor in each line circuit in a manner described in detail hereinafter. Conductors XT, AT, XU, and DU are the unique combination of four code leads to which line circuit 10 are connected. Conductors YT, CT, ZU and CU are the code leads to which line circuit 89 are connected. Conductors LB10 and LI10 extend to the common control and are used to inform the common control whether a selected line circuit is busy or idle whenever the common control tests the line circuit condition.

The present drawing discloses a plurality of code leads of which there are fourteen in number, interconnecting various portions of the system, including the common control, the registers, the camp-on circuit, and the line circuits. The direction of data flow is always to the line circuits from one of the registers, the common control, or the camp-on circuit. The plurality of noninverting OR gates shown on FIG. 19 and designated XU through DU and XT through DT are associated with the units and tens code leads, respectively. The outputs of these gates are interconnected to the code leads extending to the line circuit. These gates are provided with a plurality of inputs, and each input is connected either to the common control scanner, a register, or the camp-on circuit. These gates perform a conventional noninverting ORing function, and their primary purpose is to isolate from each other the outputs of the scanner, the register, and the camp-on circuit. The code lead outputs extending from the registers to these gates are shown on FIGS. 15 and 19; the code lead outputs from the scanner to the gates are shown on FIG. 19, while the code lead outputs from the camp-on circuit are shown extending from FIGS. 23 and 24 to FIG. 19. On FIGS. 23 and 24, the code lead output from each camp-on store is combined by the OR gates designated XUG through DUG and XTG through DTG for the units and tens digits, respectively. These gates isolate the outputs of the three camp-on stores from each other.

Figure 19:
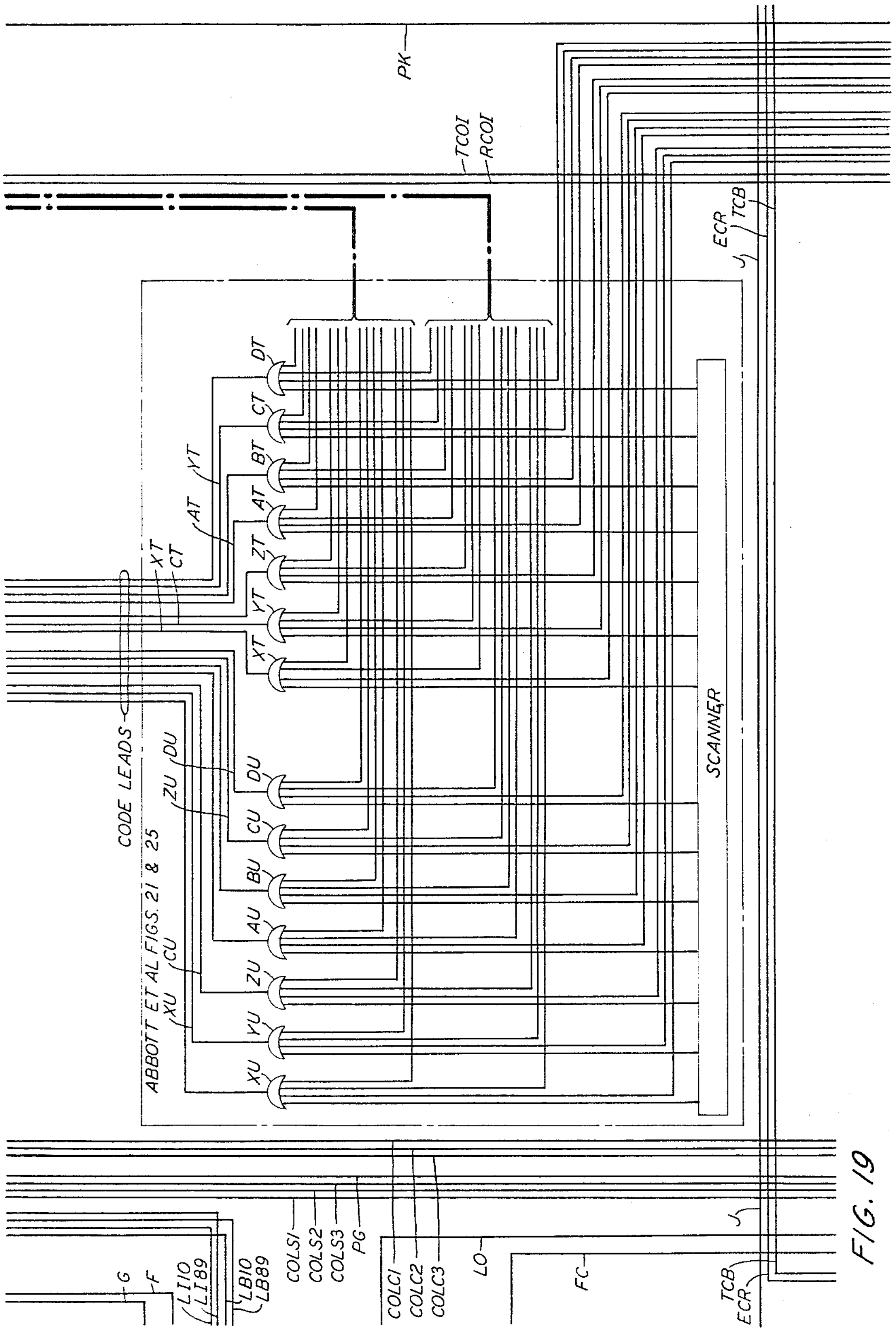

The scanner shown diagrammatically on FIG. 19 of the present specification and in detail on FIGS. 21 and 25 of Abbott et al. is basically a tens and a units counter which is operable in combinational code form and which is utilized for scanning functions. Its primary purpose is to scan the line circuits upon the initiation of a call in order to identify the line circuit requesting service. The code leads are connected inside each register to a tens and a units counter which is also operable in combinational code form. The primary purpose of the register counter is to count and store the dial pulses received by the register during the serving of a call and then, upon request, under control of the common control circuit, to gate out onto the code leads the number stored in its counter. Both the scanner and the registers are fully disclosed in detail in the Abbott et al. specification, to which reference is made for a full understanding of the manner in which these circuits operate.

The code leads are divided into two groups, with one group being for the tens digit information and the other group being for the units digit information. Of the four code leads to which each line circuit is connected, two of the leads are for the tens digit and two for the units digit. This arrangement enables data to be transmitted in combinational code form in a 2-out-of-7 code of FIG. 8. Information is transmitted in such a manner that the two code leads in each group are grounded, which represent the digits to be transmitted in the 2-out-of-7 code. Thus, a tens digit of 1 and a units digit of 0 are transmitted by the grounding of conductors XT and AT for the tens digit of 1 and by the grounding of conductors XU and DU for the units digit of 0. The grounding of all four code lead conductors of a line circuit constitutes either a selection or an identification of the line circuit, depending upon the particular purpose and stage of the call at which the code leads are grounded. All code leads are maintained at a ground potential at all times except when only four are grounded to identify or select a line circuit.

The operation of the system during the serving of calls is controlled, to a large extent, by controlling the ON or OFF condition of the L transistor in the calling and called line circuits. Referring to FIG. 15, which shows the details of line circuit 10, the L transistor of this line circuit can have its conductive state controlled by a plurality of sources. The normal condition of the line circuit when its calling station is idle is such that the F conductor is maintained at a positive potential by the common control circuit while the G conductor is held at a negative potential. The positive potential on the F conductor at this time is transmitted through resistors R12, diode D6, resistor R13, to the base of transistor L, to forward-bias the base emitter junction and saturate the transistor. When a line circuit goes from an on-hook to an off-hook condition, as its subscriber attempts to initiate a call, loop current flows from the positive on the F conductor through resistors R12, R10, and R9, over the tip and ring conductors, back through R11 to the negative potential supplied by the common control. This loop current lowers the potential at point A, which in turn removes the base drive from transistor L and allows it to turn OFF. The turn-off of the transistor raises the potential on conductor L10, extending to the common control circuit, from ground to the potential of the positive supply. The common control detects this change and then initiates the circuit actions required to scan the line circuits by means of the code leads in order to determine which line is requesting call service. The details of the circuit operations associated with this function are described in detail in Abbott et al.

At other times, the common control may apply a positive potential to the F conductor while removing the negative ground supply from the G conductor. This, in itself, will maintain the transistor ON, regardless of what is then applied to the code leads. The conductive state of the L transistors may be controlled solely by the code leads by having the common control remove all potentials from the G and F leads. The counter in either a register or a camp-on store may then be gated onto the code leads to select or test the line whose number is registered in the counter.

Let it be assumed, for the purposes of discussion, that a 10 is registered in camp-on store 1. Subsequently, when it is desired to complete the call to line 10 when it becomes idle, the number 10 is gated out of the camp-on store 1 and through the two sets of noninverting OR gates on FIGS. 23, 24, and 19 to the code leads. The tens digit of 1 is gated out onto the code leads by a grounding of code lead conductors XT and AT. The units digit of 0 is gated onto the code leads by grounding conductors XU and DU. The grounding of this combination of code leads grounds all four of the code leads of line circuit 10, and therefore, since the L transistor is exclusively under control of the code leads at this time, it now turns OFF.

*Idle and camp-on store circuit selector*

Preparatory to the actual serving of a call, the camp-on circuit must first determine which of its call stores will serve the next call. This function is performed by the circuitry of the camp-on circuit shown on FIG. 21 and comprises relays NM0 through NM3 together with transistors QB4, QB1, QB2, and QB3, respectively. This circuitry provides for the operation of one, and only one, of relays NM1, NM2, and NM3 at a time. Each of these three relays is associated with call stores 1, 2, and 3, respectively, in accordance with the numerical portion of the relay designation. The relay that is operated at any time represents the call store that will receive the next call received by the camp-on circuit. Thus, if relay NM1 is operated, call store 1 will serve the next call.

In order to understand the description of this circuit, let it initially be assumed that none of these relays is operated. A relay is operated by energizing its associated transistor and, in turn, its associated transistor is energized by controlling the potential applied to its base. The sleeve leads for the camp-on circuit are COLS1, COLS2, and COLS3. Each of these leads is connected to and controls the conductive condition of one of transistors QB1, QB2, and QB3, respectively. Each sleeve lead is grounded by the potential received via the switching network from the incoming trunk to which it is connected during the serving of a call. Also, each sleeve lead is held at essentially a +15-volt potential whenever its store is idle. Referring to FIG. 24 and lead COLS1, the source of this positive potential is through the collector-resistor RA10 of transistor QSM and then through resistor RA14 to the sleeve lead. This circuit together with resistor RA9 holds the sleeve lead at the 15-volt potential whenever transistor QSM is cut off. Transistor QSM conducts only during the call-back operation as described elsewhere.

Let it be assumed that the camp-on circuit encounters a condition in which all of its three stores are busy, following which they all go idle simultaneously. In this event, a positive potential appears simultaneously on each of the three sleeve leads. This turns ON the three transistors QB1, QB2, and QB3 and, in turn, each of their associated relays, NM1, NM2, and NM3 attempts to operate. The circuit over which a relay can operate includes break contacts of the other two relays, and thus the operation of one relay prevents the operation of the remaining two. Let it be assumed that relay NM1 operates first. In this case, its break contacts open and prevent the operation of relays NM2 and NM3.

Once relay NM1 is operated, it remains operated until the next call is received by the camp-on circuit and connected to camp-on store 1. Once this connection of a new call to camp-on store 1 is completed, sleeve lead COLS1 is grounded, transistor QB1 is cut OFF, and relay NM1 is released. Sleeve leads COLS2 and COLS3 are still at a positive potential, both of their transistors are energized, and the faster of the two relays NM2 and NM3 will now operate when relay NM1 releases. The first one that operates removes the positive voltage from the other one, thereby preventing its operation. Assuming relay NM2 operates upon the release of relay NM1, the next call received by the camp-on circuit will be directed to its camp-on store 2. At that time, sleeve lead COLS2 will be grounded, thereby releasing relay NM2 and permitting relay NM3 to operate. This relay operated will cause the next camp-on call received to be directed to camp-on store 3 and, at that time, sleeve lead COLS3 will be grounded.

Recalling that only one of relays NM1, NM2, or NM3 can be operated at a time, let it once again be assumed that only relay NM1 is operated in order to steer the next camp-on call to camp-on store 1. As described in detail elsewhere, at the time this next call is offered to the camp-on circuit, the common control circuit on FIG. 18, and, in particular gate RICO, drives conductor RIC' LOW. This conductor extends from FIG. 18 to FIG. 22, where it turns gate ROCG OFF, thereby driving its output HIGH and turning on transistor QB4 on FIG. 21, via resistors RB4 and RB5. This operates relay NM0. The operation of relay NM0 extends a path from ground on terminal 2002 of FIG. 20, through make contacts NM0, make contacts of relay NM1 (which is now operated), to conductor COLC1 extending to the network appearance of camp-on store 1 on FIG. 15. The switching network is of the self-contained type and operates to interconnect a circuit on its left-hand side with a circuit on its right-hand side solely in response to the presence of a ground marking potential on the network appearance of each circuit. The calling central office trunk which is attempting to extend a call to the camp-on circuit at this time, places a ground on its network appearance. The ground on conductor COLC1 marks the left-hand side of the network which, in response to the presence of the right-hand and the left-hand grounds, interconnects the sleeve lead of the central office with that of camp-on store 1. This connection does not require the interconnection of speech conductors between the incoming trunk and the camp-on circuit, and therefore it does not include the tip and ring circuits by means of which speech currents are normally transmitted. In the system of which the present invention is a part, the connection between an incoming trunk and the camp-on circuit requires only that the sleeve lead of each circuit be interconnected.

Immediately upon the completion of the connection, the ground supplied by the sleeve of the central office trunk circuit is extended through the network and applied to conductor COLS1. This ground turns OFF transistor QB1 on FIG. 21 and thereby releases relay NM1 and permits one of relays NM2 or NM3 to operate, as already described, in the event that their associated camp-on stores are idle as indicated by the ungrounded condition of their sleeve leads.

The HIGH on the output of gate ROCG of FIG. 22 is also extended leftwards through the make contacts of relay NM1 to conductor ROC1. This HIGH is extended over this conductor from FIG. 22 to FIG. 24, where it is extended through diode DA1 and resistor RA1 to the base of transistor QGL. The HIGH on this conductor supplies sufficient base current to turn the transistor ON and lower the potential on its collector to ground. This, in turn, grounds conductor GL1, which extends to one input of each of the readout AND gates connected to the tens and units counters. This ground potential enables the AND gates so that the conductive condition of each AND gate is controlled solely by means of the potential applied to its other input from its associated counter section. With this arrangement, the OFF section of each counter applies a HIGH potential to its AND gate while each ON section of the counter applies a LOW potential to its AND gates. The AND gates are of the inverting type, and therefore the outputs from the AND gates associated with the OFF sections will be LOW while the outputs will be HIGH from the AND gates associated with ON counter sections. The outputs of these AND gates are connected over the indicated conductors to the OR gates of FIGS. 23 and 24. Each AND gate of FIG. 24 has its output connected to an OR gate on FIG. 23 or 24. Thus, for example, AND gate CTG1 is connected to OR gate CTG, while AND gate XUG1 on FIG. 24 is connected to OR gate XUG on FIG. 23.

Each of gates XUG through DUG on FIG. 23, as well as gates XTG through DTG on FIG. 24, has three inputs. One of the three inputs of each gate connects to the output of the gates on FIG. 24 for camp-on store 1, as already discussed. The other two inputs of each gate connect to corresponding outputs for the counters of camp-on stores 2 and 3 shown diagrammatically on FIG. 23. The gates XUG through DUG and XTG through DTG serve to isolate from each other the outputs of the various camp-on stores and yet, at the same time, transmit the output from any store through to the circuitry of FIG. 19, where the output is then further extended through the XU and DU and XT through DT gates to the code leads extending to the line circuits. The output of each OR gate is connected to the indicated circuitry on FIG. 19 so as to apply to the code leads the information stored in the counters of FIG. 13.

*Receipt of call by the PBX*

Let it be assumed that the currently described call, which will ultimately require camp-on service, is received via incoming central office trunk 0 shown on FIGS. 25 and 26. The call is received from the central office over the tip and ring conductors and is recognized in the conventional manner by the attendant, who then operates her TNK (trunk) locking key, of which there is one for every incoming trunk at her position. The operation of this key operates the AC relay for the calling trunk and completes a D-C path for the tip and ring conductors through the attendant position circuitry. This trips the central office ringing. This path includes the S relay in the trunk, makes contacts 1 and 2 of relay AC, break contact 1 of the SP (split) key, the S1 and S2 windings of transformer T1, together with break contacts 4 of the SP key.

The attendant is now in communication with the calling party and asks him what PBX extension he desires. She then operates the nonlocking start key on FIG. 25 to set up a connection to a register. The operation of make contacts 1 of this key grounds the ST input to the MLD AND gate on FIG. 26. The J lead input to this gate is LOW at this time since the common control circuit is assumed to be in an idle condition. It is described elsewhere how the common control holds its J lead LOW whenever it is idle and, conversely, how it holds the J lead HIGH whenever it is busy, so that it may not accept further bids for its services until it once again becomes idle. The AC1 input to the gate is LOW since the AC relay is operated. The CT1 input of the gate is LOW because relay CT has not yet operated. Thus, all four inputs of the MLD AND gate are LOW when the start key is operated. This causes the gate to turn OFF and drive its output HIGH. The HIGH on its output is propagated through the RMLD resistor to the base of the MH transistor to turn it ON and operate relay M. Relay M, in operating, extends ground from terminal 2602, through break contacts 3 of relay CT, through make contacts 1 of relay M, extending to the C lead network appearance of this trunk. This ground constitutes the signal required by the switching network to enable it to interconnect the trunk with an idle register. A similar action has been occurring in an idle register at this time under control of the common control circuit so that the register, once it is seized, causes a ground to be applied to its C lead network appearance. This is described in detail in Abbott et al. Once the network recognizes a ground on each of its sides, it establishes a connection between the calling trunk and the register selected for the serving of the trunk.

Once the network path is established, a ground is applied to the PG lead by the network. This ground operates relay CT on FIG. 26 via make contacts 2 of relay M. Relay CT operated closes its make contacts 1 and 2 on FIG. 25 to connect the tip and ring of the trunk with the tip and ring conductors extending over the established network path to the register. Make contacts 4 of relay CT on FIG. 26 extends ground to the sleeve lead via diode DS1. This ground operates the cutoff relay in the register. Relay CT operated also extends ground over its make contacts 5 to one input of the RCTB1 AND gate on FIG. 26 to turn the gate OFF and transistor CT ON. The S input of the AND gate is already LOW since relay S has priorly operated. The S1 lead input of the gate is LOW since transistor S is normally saturated by means of the positive potential supplied to its base through resistor RS4. Relay CT operated also extends the battery on terminal 2606 through resistor CTR, through its own make contacts 6, to the lower input of the MLD AND gate. This turns the gate ON, which drives its output LOW, thereby turning OFF transistor MH and releasing relay M. Relay M, in releasing, opens the path which originally operated relay CT and also removes the ground marking potential from the C lead network appearance. The network then removes the PG ground when it detects the removal of the C lead ground.

The attendant also operates the SP (split) key when she operates the start key. The SP key remains operated and provides a holding path for the central office tip and ring conductors over its make contact 2. The same circuit also holds S relay operated. Break contacts 1 of the split key isolates the two sides of the tip and ring conductors of the trunk so that the central office party cannot hear any signals that may be impressed upon the other side of the trunk. Make contacts 3 and 4 of the split key close and apply a battery talking potential to the tip and ring conductors extending to the register. Break contacts 5 of the same key open and remove the DC path which initially tripped the central office ringing.

The operator next dials the number of the requested PBX extension into the register, as described in Abbott et al. The register counts and stores the pulses and completes the call to the requested connection if it is idle and, if it is not idle, it causes the trunk to be connected to the camp-on circuit in the manner about to be described.

In order for the trunk to be disconnected from the register and connected to the camp-on circuit, the register initiates a call-back operation in connection with which it applies a negative 24-volt potential to the S lead. This potential is extended over the network, received on the S lead of trunk 0 on FIGS. 25 and 26, and extended through make contacts 4 of relay CT, resistor RS2, diode DS2, to the base of transistor S to turn it OFF. The turn-off of this transistor drives its output HIGH, which sets the call-flop (CB) flip-flop and turns ON gate RCTB1. The setting of the CB flip-flop drives its CB' lead LOW, which enables the MHD AND gate. The turn-on of gate RCTB1 turns OFF the CT transistor and releases relay CT. The release of relay CT closes its break contacts 6, which apply the ground on terminal 2604 to the other input of the MHD AND gate. This turns the AND gate OFF and drives its output HIGH. This turns ON transistor MH and operates the M relay. The same circuit also extends a HIGH on the TCB lead extending from FIG. 26 of the trunk to FIG. 18 of the common control, where the potential is applied to one input of the TCBO OR gate. This constitutes a bid for the services of the common control.

The M relay is currently operated and relay CT is currently released in the same manner as before, and therefore a marking potential is once again applied to the C lead. The camp-on store that will serve this call has been priorly selected, as already described, and in this connection a ground has been applied to its C lead. Thus, the network is now marked on both its line and trunk sides so that, as before, it now proceeds to interconnect the circuits associated with the marked conductors. This causes a network path to be now established between calling central office trunk 0 and camp-on store 1.

The network applies a ground to the PG lead once the connection is established between the camp-on store and the trunk. This ground operates the CT relay, as already described, which in operating turns OFF the RCTB1 gate to provide a holding path for itself. The negative call-back potential has been removed from the S lead at this time, and therefore the S transistor once again turns ON from the positive potential through resistor RS4.

At the same time the operator pressed the start key, the make contacts 2 of this key, as shown on FIG. 25, operated the H relay on FIG. 26, which, by means of its make contacts, turns OFF the HG AND gate since lead 1 is LOW, thereby turning the H transistor ON to establish a holding path for the relay. The operation of this relay closes a shunting path for the tip and ring in order to provide a holding path for the central office circuit when the trunk is connected to the camp-on circuit. This path is provided by make contacts 1 of the H relay on FIG. 25. This circuit is needed so that once the operator releases from the connection, the S relay in the central office equipment will be held when the trunk is connected to a camp-on circuit and after the attendant releases from the connection.

The trunk is now connected to a camp-on circuit and the camp-on circuit now operates as subsequently described to perform the functions required of it in connection with the serving of the call.

Figure 16:
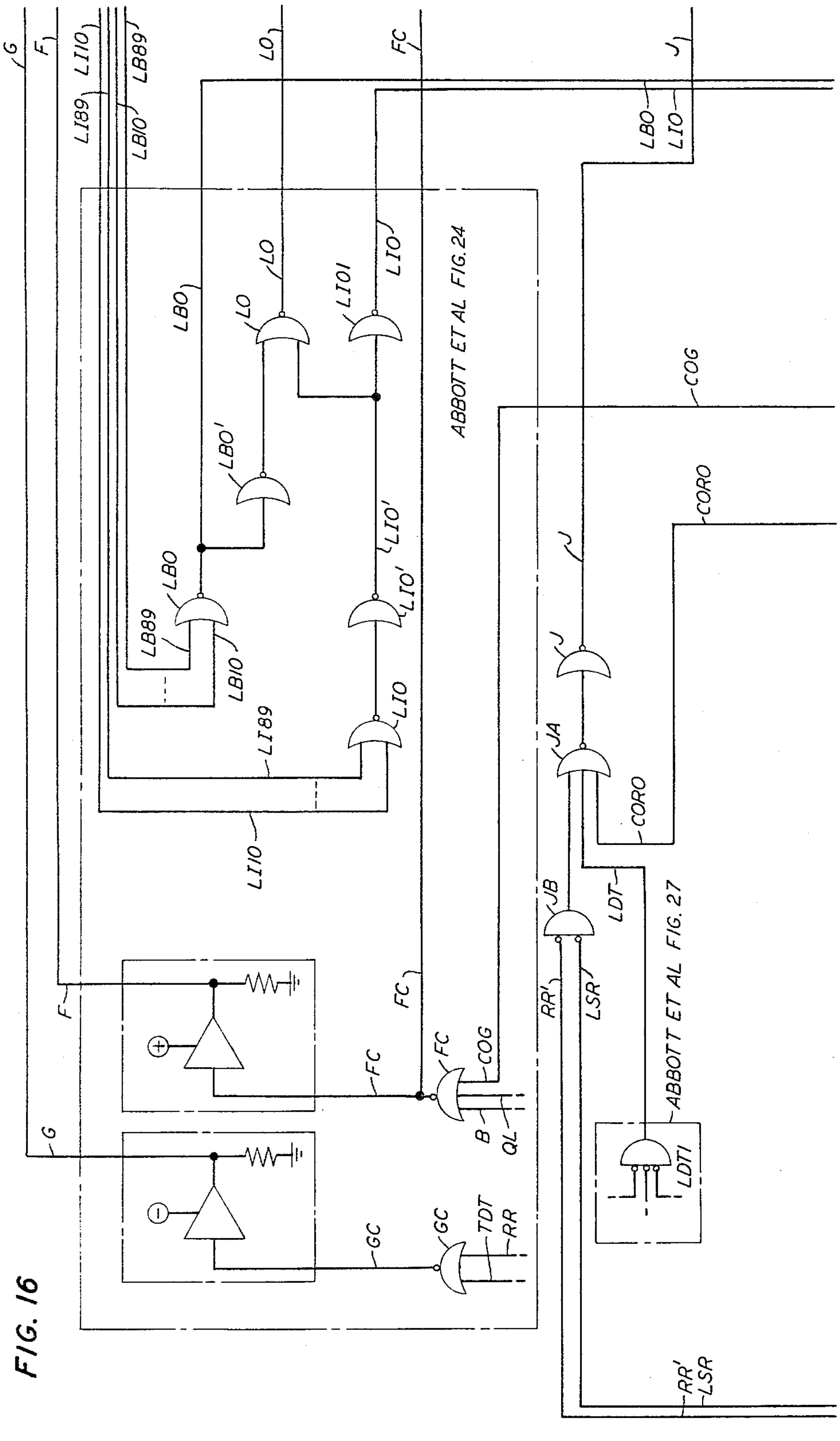

The circuitry associated with the application of control potentials to the J conductor is shown on FIG. 16. It has already been mentioned that this conductor is held LOW by the common control whenever it is idle and, conversely, it is held at a HIGH potential whenever the common control is busy and is not in a position to accept requests for service from an attendant. This J conductor extends to all circuits which may bid for the services of the common control circuit and the circuitry of each of these circuits is either permitted, or not permitted, to request service of the common control circuit, depending upon whether the J conductor is at a LOW or HIGH potential, respectively.

The J conductor is controlled by the JA and J gates on FIG. 16 in such a manner that the J conductor is LOW whenever all of the inputs to the JA gate are LOW and, conversely, is HIGH when at least one or more of the inputs to the gate are HIGH. The LDT input to this gate is LOW when a line side circuit is not requesting dial pulse service. The RR' conductor extending into the JB gate on FIG. 16 is HIGH when the common control is not in the read register mode. This HIGH grounds the input of the JA gate to which the JB gate is connected. The CORO lead extending to the input of the JA gate is LOW when the common control is not in the process of reading out a camp-on circuit. Thus, as shown on FIG. 16, the J lead is LOW when the common control is not in the line dial tone mode, provided that at the same time it is not reading out the register or a camp-on circuit.

A HIGH is on the LDT lead when the common control is in the LDT mode and this HIGH is propagated through the JA and J gates and appears on the J lead. The RR' lead is LOW when the register is being read out and this LOW is propagated through the JB, the JA, and the J gates and appears as a HIGH on the J lead at this time. If a line side register is being read out, the LSR lead is HIGH, which enables the J lead to go LOW. There is no necessity for the HIGH to be on the J lead at this time since it is provided solely to prevent the operator from being able to request service when the common control is busy on an operation that does not involve the operator. Since the operator is involved in a line side register operation, the J lead is permitted to go LOW at this time.

If a trunk side register is being read out, the call is not originated by the attendant, and therefore the LSR lead is LOW, which makes the J lead HIGH and inhibits the attendant from requesting service of the common control. When the camp-on circuit is being read out, the CORO lead is HIGH into the JA gate, which causes the J lead to be HIGH. This similarly inhibits the attendant from placing a call through the PBX while the camp-on store is being read out.

*Read-in of the number of the called station that is to be camped on*

In summary so far, the camp-on circuitry is utilized only for calls from central office trunks which cannot be immediately extended to the called station desired by the calling party. An incoming call is served by an operator at the attendant position, who: (1) converses with the calling party, (2) ascertains the PBX station with whom the calling party desires to converse, (3) depresses a key to cause the switching network to interconnect the attendant's position with a line side appearance of a register, and (4) dials the number of the called station into the register. Following this, the register attempts to complete the call to the called station in the manner described in Abbott et al. If the called station is idle, the connection is completed and the attendant releases from the connection and permits the called and calling parties to converse.

If the common control determines that the called station is busy, it connects the central office trunk to an idle camp-on store, such as for example, camp-on store 1. The attendant receives no busy tone, and therefore knows that the call has been connected to the camp-on circuit. The calling party indicates that he desires to camp on, the operator releases the TNK key, the SP key, and momentarily operates the PCS RLS (position release) key. The release of the TNK key releases the AC relay and disconnects the attendant position circuitry from the trunk. The release of the SP key prepares the attendant position for the serving of the next call. The circuit actions associated with the momentary operation of the position release key are subsequently described.

It has already been explained how the camp-on circuit determined what store would serve the next call and, in this connection, it is assumed that the current call is served by camp-on store 1. In this condition relay NM1 of the camp-on circuit is operated while relays NM2 and NM3 are released as already described.

Figure 17:
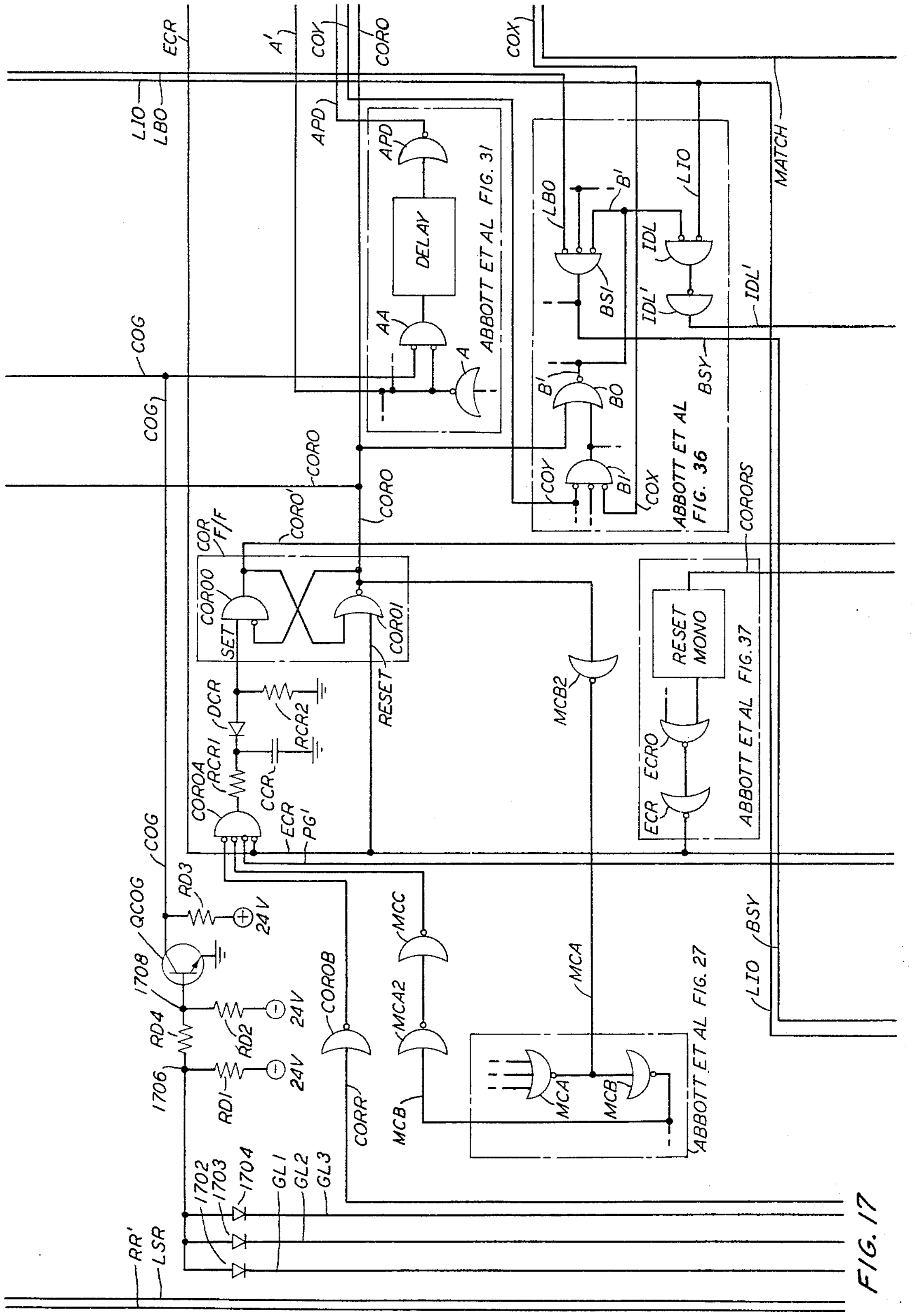
Figure 18:
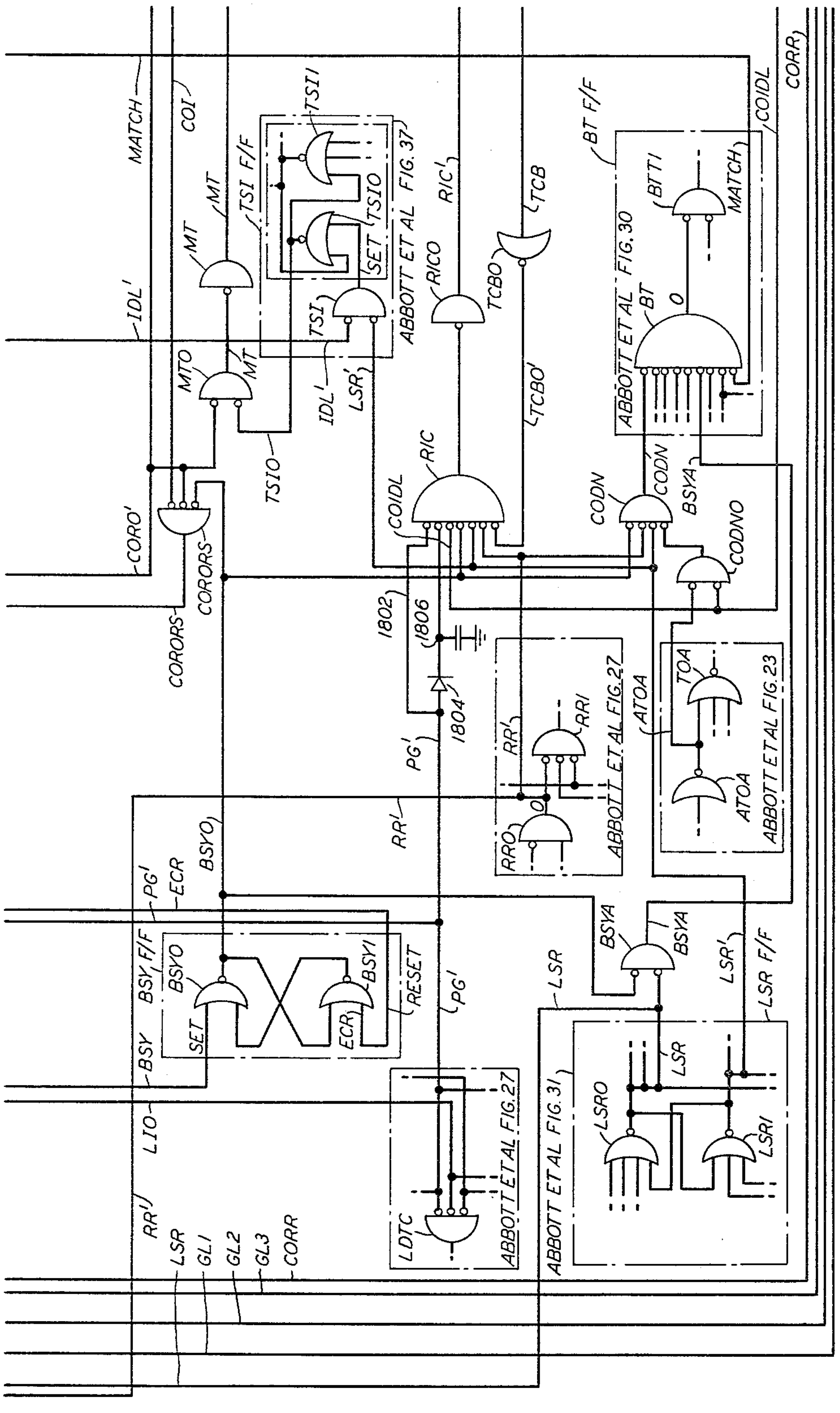

The BSY AND gate shown on FIG. 36 of Abbott et al. is connected to the camp-on circuit of the present invention in the manner shown on FIG. 17 of the present drawing. As described in Abbott et al., the output of the BSY gate goes HIGH whenever a register attempts to complete a call to a busy station. The HIGH on the output of the BSY gate sets the BSY flip-flop of FIG. 18 which causes the BYSO lead to go LOW. This lead going LOW enables the RIC AND gate since all of its other inputs are also LOW, for the following reasons: (1) The RR′ input is LOW since the common control circuit is in the read register mode. The common control is in the read register mode because a register has requested service and is being read out into the common control in an attempt to complete a call. (2) The LSR flip-flop on FIG. 18 is not set since the call now being served is from an incoming trunk. Therefore, the LSR′ lead input into the RIC gate is LOW. (3) The HIGH signal is now on the TBC input to the TCBO gate on FIG. 18 since the call now being served is from a central office trunk. This turns ON the TCBO gate and causes the TCBO′ input to the RIC gate to go LOW. (4) the COIDL input to the RIC gate is LOW whenever an idle camp-on store is available. Referring to FIG. 21, it has been priorly mentioned that the sleeve lead of any idle camp-on store is held at a positive potential. This positive potential is applied from the sleeve lead of the idle camp-on store through one of diodes DB5, DB6, or DB7 to the input of the IDLG AND gate on FIG. 21. This turns ON the gate and drives its COIDL input LOW into the RIC gate of FIG. 18. (5) The PG′ lead is LOW at this time since the common control is not currently completing a path through the switching network. This causes the 1802 input of the RIC gate to go LOW as well as the 1806 input which is connected through diode 1804 to the PG′ lead.

Thus, for the reasons just discussed, all inputs to the RIC gate are LOW, thereby causing the gate to turn OFF and drive its output HIGH. This turns ON the RICO gate, which places a LOW on the RIC′ lead extending from FIG. 18 of the common control circuit to FIG. 22 of the camp-on circuit.

The register is still connected to the trunk at the time the common control receives a request for camp-on service by means of the HIGH on the TCB lead from the trunk. It then causes the register to initiate a call-back operation, as already described, during which time the register places a negative 24 volts on the sleeve lead to set the CB flip-flop on FIG. 26 of the trunk and to release the trunk CT relay.

The LOW on the RIC′ lead of FIG. 22 is extended to the input of the ROCG gate thereby turning it OFF and driving its output HIGH. The HIGH on the output of this gate is extended through the NM1 make contacts to the ROC1 lead extending to the TS2G, TS3G, and TS4G gates on FIG. 21 as well as to the base of the QGL transistor of FIG. 24. The HIGH on the input of the TS2G, TS3G, and TS4G gates energizes the camp-on tone circuit as is elsewhere described in detail. The HIGH on the ROC1 lead into the GQL transistor of FIG. 24 turns the transistor ON, drives the GL1 lead LOW, and gates out onto the code leads the number currently stored in the tens and units digit counter of camp-on store 1.

The HIGH on the output of the ROCG gate is also extended through resistors RB4 and RB5 on FIG. 21 to the input of the QB4 transistor to turn it ON and operate relay NM0. The operation of this relay extends a ground on FIG. 20 from terminal 2002, through make contacts of relay NM0 and NM1, to lead COLC1 extending to the network appearance of camp-on store 1 on FIG. 15. This ground indicates to the network the camp-on store that is to be connected to the calling central office trunk. The CB flip-flop is now set in the trunk, which, in turn, grounds the network appearance of the trunk. With both the trunk and camp-on store 1 having their network appearances grounded, the network operates independently of the rest of the system and proceeds to interconnect the calling trunk with camp-on store 1. As previously described, this interconnection comprises only the connection of the sleeve of the trunk to the sleeve lead of the camp-on store.

The common control and the camp-on circuit together cooperate to advance the setting of counter for camp-on store 1 to the number of the camped on line during the time the calling trunk and the camp-on circuit are being connected by the network. As already described, the register attempts to complete a call to the called station by grounding the four code leads to which the called line circuit is connected. The grounding of its four code leads turns the L transistor therein OFF, thereby driving its output HIGH and the LO lead LOW on FIG. 16. The LOW on the LO lead is extended from FIG. 16 to FIG. 22 to the input of the LOG gate. This LOW on its input drives its output HIGH extending to the input of the CLG gate. The HIGH on the input of this gate holds its output LOW, irrespective of the signals applied to the other two inputs of the gate.

When the common control progressed in its operation to the point where it drove the RIC′ lead LOW extending to FIG. 22, the ROCG gate was turned ON, thereby driving the ROC1 lead HIGH, which, by means of the QGL transistor on FIG. 24, gated the number currently in the counters of camp-on store 1 onto the code leads. The normal setting of the tens counter is such that it has a 9 registered in it whenever the camp-on store is idle. Since it is assumed that the presently described system has only 80 line circuits numbered 10 through 89, the tens digit of 9 does not represent the number of any line circuit, and therefore the gating of this digit onto the code leads will cause at least one of the code leads for each and every line circuit to go HIGH. This includes the line circuit that is to be camped on. This HIGH on one of its code leads turns the L transistor of the camped-on line circuit back ON, which drives its output LOW and, in turn, drives the LO lead HIGH. The HIGH on the LO lead turns ON the LOG gate on FIG. 22, thereby driving the upper input of the CLG AND gate LOW. The RIC' lead input to this AND gate is already LOW, and therefore the conductive condition of the gate is now placed solely under control of its CLOCK 2 lead input. This input is connected to a source of positive pulses so that the gate is caused to turn ON and conduct for the duration of each pulse, following which it turns OFF until the next pulse is received. The resulting pulses on the output of the CLG gate are applied for the present call through make contacts NM1, over conductor C1 to the units counter input on camp-on store 1 on FIG. 24. The counter responds to the pulses in the manner already described and advances one counter position for each received pulse. The units counter counts the pulses and, in so doing, applies a carry pulse from its output to the input of the tens counter once for each ten pulses it receives. The two counters together thereby cooperate and operate in this manner as long as pulses are received via the C1 lead. The output of these counters is still gated out onto the code leads since the QGL1 transistor is still ON by virtue of the positive potential on the ROC1 lead. Therefore, the combination of code leads that are grounded by the counter of FIG. 24 changes once for each pulse received via lead C1. Finally, after a sufficient number of input pulses are received, the counter will advance to the point where its setting represents the number of the called station. At this time, the combination of code leads that is grounded by the camp-on store counter coincides with the four code leads that are currently grounded by the register.

When this happens, the L transistor of the called line circuit once again turns OFF and drives the LO lead LOW. The LOW on this lead turns OFF the LOG gate of FIG. 22, thereby driving its output HIGH, which turns ON the CLG AND gate to isolate its output from the source of clock pulses. This, in turn, disconnects the counter of camp-on store 1 from the source of pulses and leaves registered therein the number of the line circuit that is to be camped on. This number is registered in the counter for subsequent use in testing for the busy or idle condition of the camped-on line as well as for controlling the completion of the connection to the camped-on line once it becomes idle.

In partial summary of the circuit actions described so far, the LOW on the RIC' lead operated relay NMO on FIG. 21 to mark the network appearance of camp-on store 1 in order that the network could interconnect the control office trunk 0 with the camp-on store. The LOW on the RIC' lead simultaneously initiated a read in of the camped-on line number to the counter of camp-on store 1. This action was initiated by driving the RIC' input of gate CLG LOW. Both of these circuit actions proceed simultaneously and independently of the other in response to the LOW on the RIC' lead. However, the read in operation is completed in a relatively short time compared with the time required for the switching network to interconnect the camp-on store with the central office trunk. Therefore, the number of the line to be camped on is always entered into the camp-on store counter prior to the time a network connection is completed between the camp-on store and the trunk.

Once the connection through the network is completed between the trunk and the camp-on store, the common control resets itself in the same manner as for the reset operation described in detail in Abbott et al. When the common control resets, the RR' lead goes HIGH on FIG. 18 and disables the RIC AND gate. This drives its output LOW and, by means of the RICO gate, drives the RIC' lead HIGH. The HIGH on the RIC' lead turns ON gate ROCG on FIG. 22, thereby removing the network marking potential. It also provides an auxiliary circuit to hold ON AND gate CLG in order to prevent the clock pulses from appearing on the output of the gate. The resetting of the common control also places a HIGH on the ECR lead on FIG. 18 which, in turn, resets the BSY flip-flop.

The system of the present invention provides facilities whereby camped-on calls can only be received from central office trunks and not from PBX lines or from attendant's trunks. Thus, if the call had been placed from an attendant trunk, the calling back of the trunk from the register would have resulted in a HIGH on the ATOA lead on FIG. 18 instead of a LOW on the TCBO' lead. The HIGH on the ATOA lead will cause the output of the CODNO gate to go LOW, which, in turn, would enable the CODN gate. All of the remaining inputs of the CODN gate also appear on the RIC gate, and they would be LOW at this time. Therefore, the CODN gate would then be enabled, which would cause the CODN lead to go HIGH into the BT gate shown on FIG. 18. The HIGH on the input of the BT gate sets the BT flip-flop, which causes a busy tone to be returned to the attendant's trunk as the register is reconnected to the trunk and a busy relay is operated in the register to return busy tone to the trunk.

If no camp-on circuit is available at the time an incoming trunk desires to camp on a station, the COIDL lead will be HIGH and will inhibit the RIC gate of FIG. 18 as well as the CODNO gate. The output of this gate will enable the CODN gate, which will put a HIGH on the CODN lead, thereby setting the busy flip-flop as previously described. The setting of this flip-flop will return busy tone to the calling party served by the incoming trunk to inform him that camp-on facilities are not currently available.

*Comparison of called station number with camped-on station number*

The circuit of the present invention provides facilities whereby a subsequently initiated call cannot be completed to a called line that is already camped on. This feature is necessary since instances may occur in which a newly initiated call might otherwise be completed to a camped-on called line which has just gone idle. If precautions were not taken, the subsequently initiated call could be successful in obtaining a connection to the called line, even though a priorly initiated call had camped on it for some time waiting for it to become idle. The circuit of the present invention precludes the possibility of this occurrence by checking the dialed number on every call with the number of each line currently being camped on.

The comparison is done by gating both the dialed number and the camped-on number onto the code leads and by then checking for a match between two numbers by means of the potential of the LO lead. If the LO lead stays LOW when both numbers are gated onto the code leads, this means that the numbers match and that the called line is currently being camped on. The system does not permit the newly initiated call to be completed in this case, and instead returns busy tone to the calling party in the same manner as if the called line was still busy and not camped on.

If the two numbers gated onto the code leads do not match, the transistor in the called line circuit will stay ON and will cause the LO lead to go HIGH. The LO lead going HIGH signifies that the two numbers do not match and that, therefore, the called station is not being camped on. The requested connection is then completed in the normal manner.

The circuitry which controls the matching operation is shown on FIG. 20. Looking at the various inputs to gate COMPTG, the CORO input is LOW because a camp-on store is not currently being read out. The FL input is LOW because a camp-on read in operation is not currently being performed. The input leads APD and COY are under control of the common control, and both of these are driven LOW when a comparison operation is desired.

In partial summary of the circuit actions described so far, the FL and CORO inputs to the COMPTG gate on FIG. 20 are LOW at this time. Subsequently, when the common control initiates a comparison operation to determine whether the number stored in a register and representing a newly initiated call matches or does not match a number stored in one of the camp-on stores, it drives both of the APD and COY leads extending into the same AND gate COMPTG LOW. The gate now turns OFF and drives its output HIGH. This transmits a positive pulse through the CC1 capacitor to the top input of the COMPG AND gate. All of the other inputs to this AND gate are LOW at this time, and therefore the positive pulse on its upper input turns the gate ON and drives its output LOW. Each rectangle designated SMP1, SMP2, and SMP3 represents a monopulser circuit which is effective upon the reception of a negative pulse on its input to generate and apply a positive pulse at its output. The input of each monopulser comprises the terminal on its right-hand side and its output comprises the terminal on its left-hand side. With this arrangement, the output of each monopulser feeds the input of the following one, except for the last monopulser SMP3.

The turn-on of gate COMPG drives its output LOW and transmits a negative-going signal to the input of monopulser SMP1. This negative signal energizes the monopulser, which develops and applies a positive pulse to its output terminal 2006. The positive pulse on this terminal is extended to the 2001 input of COMPG gate to hold it ON and hold its output LOW. The positive pulse on terminal 2006 is also applied to conductor ROB1, which extends from FIG. 20 to FIG. 24, where it is connected via diode DA2 and resistor RA2 to the base of transistor QGL. The positive pulse on this conductor turns the transistor ON and drives its output LOW for the pulse duration. This, in turn, causes the number stored in the counter of camp-on store 1 to be gated out onto the code leads via the readout AND gates for the duration of time that the positive pulse remains on conductor ROB1.

If the number stored in camp-on store 1 does not agree with the number applied to the code leads by the register at this time, at least one of the code leads for the called line circuit will have a HIGH potential on it at this time. This will cause the L transistor of the line circuit to turn ON and drive the LO conductor on FIGS. 16 and 20 LOW. A LOW on this conductor at this time, as previously explained, indicates that the two numbers now being applied to the code lead do not match.

Subsequently, the positive pulse generated by and applied to the output of monopulser SMP1 terminates and removes the positive potential from conductor ROB1. This ends the readout operation for camp-on store 1 so that the number stored therein is no longer applied to the code leads. The output of monopulser SMP1 is applied to the input of monopulser SMP2 and the negative-going signal on terminal 2006, as monopulser SMP1 turned OFF, energizes monopulser SMP2 so that it generates and applies a positive pulse to its output terminal 2008. The positive pulse on terminal 2008 from monopulser SMP2 is applied back to the 2005 input of gate COMPG to hold it ON. This holds conductor 2012 LOW. The positive pulse on terminal 2008 is also applied to conductor ROB2 extending from FIG. 20 to FIG. 23, where it is connected to camp-on store 2. This conductor controls the readout of the number in camp-on store 2 for the duration that a positive pulse is applied to it in the same manner as previously described for conductor ROB1 and camp-on store 1. Once again, conductor LO remains at a HIGH potential if the number read out of camp-on store 2 does not agree with the number read out of the register.

Subsequently, monopulser SMP2 terminates its output pulse, thereby driving conductor ROB2 and terminal 2008 from a positive to a 0 potential. The negative transition on the trailing edge of this pulse energizes monopulser SMP3, which generates and applies a positive-going pulse to its output terminal 2010. The positive pulse on terminal 2010 is extended to the 2003 input of gate COMPG to hold it ON and to hold its output conductor 2012 LOW. The positive pulse on terminal 2010 is also applied to conductor ROB3. This conductor extends to FIG. 23, where it causes the number registered in this camp-on store to be read out and applied to the code leads. Once again, conductor LO remains at a HIGH potential if the number read out of camp-on store 3 does not match that read out of the register.

The preceding paragraphs have explained the circuit actions that take place for a sequence in which each one of the camp-on stores is gated onto the code leads in sequence and in which none of the numbers stored therein agreed with the number applied to the code leads by the register. The conductor 2012 input to gate MG on FIG. 20 is LOW for the duration of the readout sequence from each camp-on store since gate COMPG is held ON by the positive pulses fed back to it from the outputs of the monopulsers during the readout operation. The A′ input to gate MG is also LOW at this time from the common control. The FC conductor to the gate is LOW for the same reason. Thus, since the FC, the A′, and the 2012 inputs to gate MG are LOW, the conductive status of the gate at this time is determined solely by the potential on the LO conductor. As already mentioned, this conductor is held at a HIGH potential during the readout operation in the event a match is not detected. The HIGH on the LO conductor holds the output of gate MG LOW. This prevents the FMG flip-flop from being set at this time. As is subsequently described, the setting of this flip-flop would signal the common control that a match had been detected.

The 2014 input to gate CXG on FIG. 20 is LOW at this time because the FMG flip-flop was not set during the preceding readout sequence. The 2016 input to the CXG gate is also LOW because the output of gate COMPG is HIGH and its inversion through gate LCOG is LOW to conductor 2016. The A′ input of gate CXG is also LOW. Thus, we now have the three inputs of the gate LOW. This puts a HIGH on the output of the gate and, by means of gate COXG, a LOW on conductor COX extending back to the input of gate B1 of the common control circuit on FIG. 17. The LOW at this point indicates to the common control that no match was detected, i.e., that the called number on a call currently served by the common control circuit is not camped on and that, therefore, the requested connection may be completed in the normal manner.

The following paragraphs describe the circuit operations that occur in the event a number stored in the camp-on circuit agrees with a newly dialed number gated onto the code leads by the register. For example, assume that the number in camp-on store 1 matches that in the register. As before, conductors CORO and FL into the COMPTG gate on FIG. 20 are LOW at this time. When common control requests a comparison, it transmits LOW's to the same gate on conductors APD and COY.

This drives all four inputs of this gate LOW, thereby permitting it to turn OFF and drive its output HIGH. This transmits a pulse through capacitor CC1 to gate COMPG, which drives its output LOW and causes monopulser SMP1 to produce a positive pulse on conductor ROB1 to gate out camp-on store 1 onto the code leads. Since the number in camp-on store 1 and the register are assumed to agree, the four code leads of the line circuit represented by this number are now grounded. This causes the L transistor of the line circuit to turn OFF and conductor LO into the MG gate of FIG. 20 to go LOW. Since the other three inputs of this gate are now LOW for reasons already described, the output of the gate goes HIGH and sets the FMG flip-flop so that its output applies a HIGH potential to the MATCH conductor extending to the input of the BT gate on FIG. 18. The HIGH on the input of this gate sets the BT flip-flop on FIG. 18 which, in the manner described in detail in Abbott et al., returns a busy tone to the calling subscriber in the same manner as if the called line were busy and not currently camped on.

*Readout of registered number from camp-on store*

The following paragraphs describe the circuit operations associated with the readout of a called number registered in a particular camp-on store. For this explanation, it is assumed that there is a number registered in camp-on store 1 on FIG. 24 and that camp-on stores 2 and 3 are idle.

The circuitry that controls the readout operation is shown for the most part on FIG. 22. The rectangle on this figure designated CLOCK operates at half-second intervals and applies to its output conductor a pulse every half second so long as both of its inhibit input leads are LOW. The output pulses from the clock are fed to the input of a three-stage counter comprising gates TC1G, TC2G, and TC3G. This counter advances its operative position one step for each pulse received from the clock. For this explanation, let it be assumed that the output of gate TC2G is HIGH while the outputs from gates TC1G and TC3G are LOW.

Since we assumed that camp-on store 1 currently has a number registered in it while camp-on stores 2 and 3 are idle, the sleeve lead for camp-on store 1, COLS1, will be grounded by virtue of its connection with the incoming trunk while the sleeve leads for the other camp-on stores COLS2 and COLS3 will have a positive potential applied to them at this time by the collector of the transistor in each store equivalent to transistor QSM for camp-on store 1 on FIG. 24.

An analysis of the potentials currently applied to the inputs of gates R1G, R2G and R3G on FIG. 22 shows that gate R1G has the LOW on conductor COLS1 applied to it and also has applied to it the HIGH potential from the output of gate TC2G. This HIGH potential turns gate R1G ON and drives its output LOW. The HIGH potential on sleeve conductor COLS2 and COLS3 are applied to the input of gates R2G and R3G, respectively. This causes the output from each of these gates to be LOW. Thus, the output of each of gates R1G, R2G, and R3G is LOW at this time.

After a half second, the clock will generate another positive pulse and apply it to the three-stage counter to advance it one step so that its gate TC3G is now OFF while the other two gates are ON. An analysis of the input potentials applied to gates R1G, R2G, and R3G shows that they all remain ON at this time. Gate R1G is held ON from the HIGH output from gate TC3G while gates R2G and R3G are held ON by the HIGH potential on their associated sleeve leads.

After a half second, the clock again generates another output pulse to step the counter so that gate TC1G is now OFF while the remaining two gates are ON. All of its inputs are now LOW and gate R1G turns OFF and drives its output HIGH. This puts a HIGH on one input of gate RG which drives its output LOW to one input of gate RRG. The other input of the RRG is connected to the output of the RG flip-flop whose output is normally LOW since the gate RCG of the flip-flop is set each time CLOCK generates an output pulse. Both of the inputs to gate RRG are LOW at this time so that the gate turns OFF and drives its output conductor CORR HIGH. The HIGH on this output conductor is transmitted to the input of the COROB gate in the common control of FIG. 17 as a readout request to the common control. The HIGH on conductor CORR also extends to one of the inhibit leads of the clock where it is effective to inhibit any further output pulses from the clock for the duration the HIGH potential persists.

The HIGH on the input of gate COROB on FIG. 17 drives its output LOW extending to one input of gate COROA on the same figure. The remaining inputs to gate COROA are LOW now, since the common control is assumed to be in an idle condition and not in another one of its operative modes. Therefore, gate COROA turns OFF and drives its output HIGH. This extends a HIGH to the input of the COR flip-flop and drives it to a set condition so that the CORO lead goes HIGH while the CORO′ lead goes LOW. The HIGH on the CORO conductor is extended to FIG. 22, where it is applied to an inhibit lead of the clock in order to continue its inhibited condition. The HIGH on the conductor is also applied to the reset lead of the RG flip-flop. This resets the flip-flop and drives its output HIGH connected to one input of each of gates RG and RRG. This turns both gates ON, which drives conductor CORR LOW and removes the readout service request from the common control. However, even through the request is removed, the common control remains in the camp-on readout mode by virtue of the recently initiated readout request.

It has previously been mentioned that at this time a HIGH potential appears on the output of gate R1G of FIG. 22 while a LOW potential appears on the output of gates R2G and R3G. The output of each of these gates is connected to various combinations of inputs on gates ROA1G, ROA2G, and ROA3G. Each of these latter three gates is associated with one of the camp-on stores and the particular gate that is associated with the camp-on store that is to be read out at this time is now turned OFF. It has been mentioned that the current description is based on the assumption that camp-on store 1 is to be read out at this time. Thus, looking at the inputs to gate ROA1G, it may be seen that its RWG input conductor is LOW at this time because the RG flip-flop is reset. Its CORO′ input is now LOW since the common control is in the camp-on readout mode. Its input which is connected to the output of gate R2G is LOW since this gate is currently turned ON. Also, its input connected to the output of gate R3G is also LOW since this gate is currently turned ON. Since all the inputs of gate ROA1G are now LOW, the gate turns OFF and drives its output HIGH. Conductor ROA1 is connected to the output of this gate and the HIGH on this conductor at this time extends to FIG. 24 where it may be further extended through resistor RA4, diode DA3, resistor RA3, to the base of transistor QGL, thereby saturating the transistor and driving its collector output conductor GL1 to ground. This permits the number stored in the counter of camp-on store 1 to be gated onto the code leads in the manner priorly described.

Conductors ROA2 and ROA3 on FIG. 24 are LOW at this time. This prepares the call-back sequence so that once conductor MT is caused to go LOW, a negative 24-volt potential will be applied to the COLS1 sleeve lead conductor as elsewhere described.

As the number registered in camp-on store 1 is gated onto the code leads, the ground on conductor GL1 of FIG. 24 is extended to FIG. 17 where it may be further extended through diode 1702 and resistor RD4, to the base of transistor QCOG. This potential turns OFF the transistor and drives its COG output conductor HIGH. The HIGH on this conductor is extended to an input of the FC gate on FIG. 16. In the manner described in detail in Abbott et al., the HIGH on the input of the FC gate drives its output LOW, which, in turn, causes the potential on the bias control lead F on FIG. 6 to go LOW to all line circuits. This leaves the L transistor in each line circuit solely under control of the code leads which, in turn, are now controlled by the camp-on circuit. The gating of a camped-on number of 10 from store 1 onto the code leads grounds all four code leads associated with the camped-on line circuit 10. This permits its L transistor to turn OFF and, at the same time, maintains a positive potential on at least one of the code leads for every other line circuit to hold its transistor ON.

If the camped-on line 10 is still busy, the positive potential will be extended through resistor R6 on FIG. 15 and from there through diode D3, through the make contacts of the cutoff relay CO, which is operated since the line is still busy, to conductor LB10 extending to the common control circuit. The positive potential on this conductor causes the LBO lead on FIG. 16 to go LOW. The CORO lead, which is HIGH since the common control is currently in a camp-on readout mode, extends to one input of the BO gate on FIG. 7, where it causes the B′ lead to go LOW, thereby enabling the BSY gate and causing the BSY output of this gate to go HIGH since the LBO lead is LOW as has already been assumed. The BSY lead going HIGH sets the BSY flip-flop on FIG. 18 and thereby causes the BSYO lead to go LOW. The CORO′ input to the CORORS AND gate is already LOW since the common control is currently in the camp-on readout mode. The COI conductor input to the same gate is LOW of this is not the first time the camp-on store is being read out. The reason for this that transistor QCOT on FIG. 21 is now ON. The LOW on all inputs to the COROS gate causes its output conductor extending to the reset monopulser on FIG. 17 to go HIGH. This, in turn, causes a pulse on the ECR lead, which resets the common control circuit in the manner described in detail in Abbott et al. The reset of the common control circuit restores the potential on the CORR and the CORO leads on FIG. 22 to the normal state. This permits the clock pulse generator to resume its operation and cause a readout of other camp-on stores as well as subsequent readouts of camp-on store 1.

The readout operation takes place periodically as long as the line that is currently camped onto by camp-on store 1 is still busy, as elsewhere described. The first time this camp-on store is read out, a camp-on tone indication is given to the line which is being camped on. This is done by inhibiting the reset of the common control for approximately a half second by a HIGH on the COI lead into the CORORS gate. After the one-half second interval, the camp-on circuit drives the COI lead LOW and the common control is reset in the normal manner by the HIGH on the CORORS gate output.

If the camped-on line is idle when the camp-on store 1 is read out, the cutoff relay CO in the called line circuit on FIG. 15 is released on the HIGH on the collector of the L transistor, which is cut off at this time, is extended through diode D3 on FIG. 15, break contacts CO and diode D4 to conductor L10. The HIGH on this conductor is then further extended through gates LIO, LIO′, and LIO1 gates of FIG. 16 and appears as a LOW on the LIO lead output of the LIO1 gate. The LIO lead extends into the IDL gate on FIG. 17 where, since the B′ lead is already LOW, it turns the IDL gate OFF and causes a LOW to the IDL′ lead into the TSI gate on FIG. 18. The LSR flip-flop on FIG. 18 is not set, and therefore the LSR′ lead is LOW into the TSI gate. This causes its output to go HIGH and set the TSI flip-flop. The TSIO lead is now LOW into the MTO gate on FIG. 18. Also, the CORO′ lead is LOW into the same gate, thereby causing its output to go HIGH to the MT′ lead and a LOW on the MT lead via the MT gate into the camp-on circuit on FIG. 24. The camp-on circuit responds to the LOW on the MT lead and initiates a call-back operation of the trunk to which the camp-on store is connected. This is elsewhere described in the specification.

*Camp-on tone circuit*

A camp-on tone is applied once to a line after it is camped on in order to inform the called party that someone else is attempting to reach him. Once the attendant has removed herself from the connection, the tone is applied the first time the camped-on line is tested for a busy condition by reading out the number in the camp-on store as described in the immediately preceding section of the specification. The circuitry shown on the upper portion of FIG. 21 controls the application of the camp-on tone. Gates TS1G, TS2G, TS3G, and TS4G together provide a steering control circuit. Normally, gate TS4G is OFF and its output is HIGH. When a number is read into a camp-on store, it is done by having a HIGH placed on one of leads ROC1, ROC2, or ROC3, depending upon which camp-on store is read into. For the purposes of this discussion, it is assumed that a number has just been read into camp-on store 1. This means that conductor ROC1 goes HIGH. A HIGH on this conductor turns ON gate TS4G and holds gates TS2G and TS3G ON. This means that gate TS1G must turn OFF. This, in turn, holds the remaining three gates ON.

Whenever the camp-on circuit subsequently attempts to read out one of the camp-on stores, it drives the ROA1, ROA2, and ROA3 leads HIGH periodically. However, normally, points A, B, and C on FIG. 21 are held at a negative 24-volt potential via resistor RC13 on FIG. 20, and thus the HIGH applied to the ROA1, ROA2, and ROA3 leads is not sufficient to overcome the back-bias on diodes DC3, DC4, and DC5 extending to the input of gates TS1G, TS2G, and TS3G, respectively. However, when the attendant removes herself from the connection, she does so by momentarily depressing the POS RLS key which, by means of the associated slow-release relay, maintains a ground on conductor TK for the release time of the relay. The ground on this conductor extends from FIG. 25 to FIGS. 20 and 21, where it overcomes the negative 24-volt potential and allows the next HIGH on any one of conductors ROA1, ROA2, and ROA3 to be extended through to its associated one of gates TS1G, TS2G, or TS3G, respectively. Thus, for the present call, once the attendant operates the POS RLS key, a ground is applied to the PK conductor to overcome the back-bias on diode DC3 on FIG. 20 so that the next time lead ROA1 goes HIGH to read out camp-on store 1, the HIGH is extended through diode DC3 to the input of gate TS1G. The HIGH extended to the input of this gate turns it ON and drives its output HIGH. This turns ON gate TS1G. Gates TS2G, TS3G, and TS4G all attempt to turn OFF at this time. However, gates TS2G and TS3G are slowed down by capacitors CC8 and CC9 on their outputs. This enables gate TS4G to be the successful gate in turning OFF. The turn-off of this gate holds the other gates ON. A HIGH potential is applied to the base of transistor QD1 upon the turn-off of gate TS4G. The positive potential on the base of QD1 drives its collector to a ground potential and transmits a negative pulse through capacitor CO13 and diode DC7 to the base of transistor QD2. Transistors QD2 and QCOT together with transistor QD1 comprise a monopulser. The timing on this monopulser is approximately a half second, and for this time the collector output of transistor QCOT is HIGH. This puts a HIGH on conductors COI and, by means of resistor RC20, causes transistor QSW to saturate. The oscillator shown on the lower portion of FIG. 20 has the QSW conductor as its controlling medium and operates in such a manner that it oscillates whenever conductor QSW is grounded. Thus, since this conductor is grounded whenever transistor QSW is saturated, the transistor oscillates for the 500 milliseconds transistor QSW is saturated by the output of the monopulser.

The HIGH voltage on conductor COI from the output of transistor QCOT on FIG. 21 holds the common control circuit in its camp-on readout mode. For the duration of this period, the camp-on control causes the number stored in camp-on store 1 to be gated onto the code leads and thereby ground the four conductors associated with the camped-on line. This turns its line circuit L transistor OFF and saturates its LM transistor to operate relay LMR. Relay LMR in operating closes its make contacts extending to conductors TCOI and RCOI, which interconnect the oscillator of FIG. 20 with the tip and ring of the camped-on called line. The output of the oscillator is thus applied to the tip and ring and provides a camp-on tone that may be heard by the camped-on party.

The circuit of the present invention causes a camp-on tone to be applied to a camped-on line only once, rather than a plurality of times, in order to minimize annoyance to the parties on the busy connection. This action is controlled by the gates TS1G through TS4G on FIG. 21. It has already been mentioned that the camp-on tone is applied when the camp-on store is first gated out onto the code leads in order to test for the busy-idle condition of the camped-on line. This, in turn, causes the ROA1 through ROA3 leads associated with the camp-on store to go HIGH on FIG. 21. Once again, let it be assumed that camp-on store 1 is being read out for the first time and that, therefore, its lead ROA1 goes HIGH. Since this is the first time the store is being read out for this call, its gate TS1G will be OFF by virtue of the fact that the ground applied to conductor ROC1 when the store was first read into turned ON gates TS2G, TS3G, and TS4G, thereby driving gate TS1G OFF. Since gate TS1G is OFF, the HIGH on conductor ROA1 turns it ON and causes gate TS4G to go OFF since its output is not slowed down by a capacitor, as are the outputs of the remaining gates. The sudden turn-off of gate TS4G energizes the camp-on tone as priorly described.

The next time camp-on store 1 is read out, its conductor ROA1 will again go HIGH. However, at this time, its gate TS1G will already be ON and will therefore not be turned ON by the ROA1 lead potential. Since it cannot be turned ON at this time, this chain of gates will not be able to be turned OFF in order to energize the camp-on tone circuitry. This prevents the camp-on tone from being applied more than once at the beginning of the camp-on period.

Also, the PK lead extending from the operator position to FIGS. 20 and 21 provides an additional means which prevents camp-on tone from being applied continuously to a line. When the operator is not attached to the call, the PK lead is held at a negative 24-volt potential by resistor RC13. This back-biases diodes DC3, DC4, and DC5 and prevents the HIGH on any of leads ROA1, ROA2, or ROA3 from passing through the diodes to gates TS1G, TS2G, or TS3G. Since the gates cannot receive input signals, they cannot change states and thereby energize the camp-on tone oscillator.

*Call-back operation*

Once it has been determined, as a result of a readout operation, that the camped-on line has become idle, the common control and the camp-on circuit together cooperate to initiate a call-back operation. The purpose of a call-back operation is to reidentify the incoming trunk to the common control circuit in order that the switching network may then interconnect the network appearance of the trunk with the network appearance of the camped-on line circuit.

Referring to FIG. 24 of the camp-on circuit, conductors ROA2 and ROA3 are LOW at this time since the common control circuit is in the readout camp-on mode. As already described, once it has been determined that the camped-on line is now idle, the common control causes the MT conductor to go LOW. This makes all inputs to the base of transistor QSO LOW on FIG. 24. This turns this transistor OFF and turns transistor QSM ON to the point of saturation. Transistor QSM applies the negative 24 volts on its emitter to its collector, from where it may then be further extended through resistor RA14 to conductor COLS1 extending to the switching network appearance of camp-on store 1 on FIG. 15. The negative potential is then further extended through the network to the sleeve of incoming trunk 0, which is currently connected to camp-on store 1. The negative potential on the sleeve of this trunk sets its CB flip-flop on FIG. 26 and releases its CT relay on FIG. 26. The M relay on FIG. 26 operates and causes its C conductor to apply a ground to the network appearance of the trunk. The C lead of the camped-on line circuit is already grounded through break contacts CO and make contacts LMR. The switching network is now able to identify the camped-on line circuit from the ground on its C conductor and is further able to identify the incoming trunk by means of the ground on its C conductor. It responds to the presence of these two grounds and interconnects the tip, ring, and sleeve of the incoming trunk 0 with the corresponding conductors of the camped-on line circuit. This completes the connection requested by the calling party to which incoming trunk 0 was originally connected.

*Call completion*

When the connection is completed via the network from the trunk to camped-on line circuit 10, ringing is applied from the ringing generator shown on FIG. 25 over the ring lead to the called station. When the station answers and goes off-hook, the negative voltage on the ring lead is applied back to the tip lead and from there through make contacts 1 of relay CT, make contacts 5 of relay M, to the RDC conductor extending to FIG. 26 to the input of the RD OR gate. The negative potential on its input turns the gate OFF and drives its output HIGH. This turns ON the RM AND gate which, in turn, turns OFF the MH transistor and releases the M relay. The release of the M relay disconnects the ringing generator from the tip and ring conductors. At this time, the contact 3 of the H relay on FIG. 25 applies a positive potential to the ring lead. When the call is answered, this positive potential is returned and received on the tip lead and applied, by means of make contacts 2 of relay H to the H1 input of the HG AND gate on FIG. 26. This positive potential turns the gate ON, driving its output LOW and turning OFF the H resistor, which, in turn, releases the H relay. The connection is now complete between the PBX extension and the central office, and the central office outgoing trunk supplies talking battery to the connection. Relay S remains operated for the duration of the call. The continued operation of relay S holds relay CT operated. At the end of the call, S releases and, in turn, releases relay CT. This, in turn, restores the trunk to an idle condition. The CB flip-flop on FIG. 26 of the trunk has been reset by now by a positive pulse on the ECR lead from common control.

*Reset operation*

The following paragraphs describe the circuit functions associated with the reset operation of the camp-on store. Let it be assumed that a number has been stored in camp-on store 1 and has now been successfully read out. In other words, the trunk which was originally connected to camp-on store 1 has now been connected to the line that it was camped onto.

The interconnection of the incoming trunk to the desired line removed the ground from sleeve conductor COLS1. This allowed the reset point of the tens counter of camp-on store 1 to go HIGH on FIG. 24. In addition to being held LOW by sleeve conductor COLS1, the RINH1 lead, as well as the CORO′ lead also have the ability to hold the reset point of the counter LOW. This ensures that the counter cannot be reset if the circuit is in the process of reading out. RINH is held LOW during a read in operation in order to ensure that the counter cannot be reset inadvertently during the read in operation. Conductor RINH is grounded at that time by the make contacts of relay NM0 operated. A ground on PG conductor from the switching network will also hold conductor RINH LOW via diode DBH on FIG. 22. This ensures that the counter cannot be reset while the switching network is in the process of completing a connection.

Relay NM0 is operated only during the read in sequence and releases shortly thereafter. This permits conductor RINH to go HIGH. The CORO' lead goes HIGH after the readout operation is finished, and the COLS1 lead goes HIGH after the camped-on call has been disconnected from the camp-on circuit and connected to the line circuit it was camping on. Thus, at this time, all of the inputs to the reset point go HIGH, thereby allowing the reset point of the tens counter to go HIGH and reset the counter so that a tens digit of 9 is entered therein in preparation for the serving of the next call by this camp-on store. As already mentioned, a tens digit of 9 is used since this does not match the tens digit of any line circuit in the disclosed embodiment. Thus, this ensures that the number gated onto the code leads by the register and the camp-on store will disagree during the read in interval, thereby allowing the number of the camped-on line circuit to be properly gated into the camp-on store when it serves the next call. A reset operation is not performed by the units counter since the precise setting of that counter during the read in operation is of no particular concern.

It is to be understood that the above-described arrangements are but illustrative of the application of the principles of the invention. Numerous other arrangements may be devised by those skilled in the art without departing from the spirit and scope of the invention.

What is claimed is:

1. In a telephone switching system having a called number register which receives the called line number on each call served by said system, a camp-on circuit including a camp-on register, a comparison circuit connectable to both of said registers upon the receipt by said system of a call directed to a busy line and requiring camp-on service, and means operative under control of said comparison circuit for entering into said camp-on register the busy called line number currently stored in said called number register.

2. The invention recited in claim 1 in combination with means responsive to the entry of said called line number into said camp-on register for causing said called line to be camped on.

3. The invention recited in claim 1 in combination with means for comparing the number in said camp-on register with that entered into said called number register on each call subsequently received by said system, means responsive to the subsequent receipt of a call and effective upon a determination that the numbers in said two registers are identical for preventing the completion of said subsequently received call, and means effective upon a determination that the numbers in said two registers are not identical for enabling said subsequently received call to be completed.

4. The invention recited in claim 2 in combination with means operative under control of said camp-on register for repeatedly testing the busy condition of the camped-on line for the duration of a camp-on interval.

5. The invention recited in claim 4 in combination with means effective when said camped-on line becomes idle for completing said call to said camped-on line under control of said camp-on register.

6. In a telephone switching system having a register which receives the called line number on each call served by said system, a camp-on circuit including a camp-on register, a comparison circuit connectable to both of said registers upon the receipt by said system of a call directed to a busy line and requiring camp-on service, and energizing means effective upon receipt of a call requiring camp-on service and operative under control of said comparison circuit for advancing the operative position of said camp-on register until the number registered therein matches that in said first-mentioned register.

7. The invention recited in claim 6 wherein said energizing means comprises, a normally open gate, a register advancing means connectable to said camp-on register by said gate and effective when connected to advance the operative position of camp-on register, means for closing said gate to advance said camp-on register in response to a signal from said comparison circuit that the numbers in the two registers do not match, and means effective for opening said gate when said camp-on register advances to a position in which the number stored therein matches the called number in said first-mentioned register.

8. In a telephone switching system having a called number register which receives the called line number on each call served by said system, a camp-on register comprising a pulse counter having a plurality of operative counting positions each of which represents the registration of a unique number, a source of pulses, a normally open gate connected between said pulse source and said counter, a comparison circuit connectable to both of said registers upon the receipt of a call by said system directed to a busy line and requiring camp-on service, means responsive to said connection of said comparison circuit for closing said gate, means in said counter responsive to the closing of said gate for advancing said counter one operative position for each received pulse, and means including said comparison circuit operative for opening said gate when the number in said camp-on register matches that in said called number register.

9. In a telephone switching system having a called number register into which is entered the called line number on each call served by said system, a plurality of data-receiving conductors connected to said register, a camp-on register comprising a pulse counter having a plurality of operative counting positions each of which represents the registration of a unique number, means for connecting said counter to said data-receiving conductors, means responsive to the receipt of a call directed to a busy line and requiring camp-on service for applying output potentials to said conductors from said called number register and said camp-on register indicative of the number currently stored in each of said registers, a source of pulses, a normally open pulse gate interconnected between said pulse source and said counter, a comparison circuit connected to said conductors, means in said comparison circuit operable in response to the potentials applied to said conductors by each of said registers for determining whether the number stored in the camp-on register matches that in said called number register, means effective upon receipt of a call requiring camp-on service and operative under control of said comparison circuit whenever the numbers in the two registers do not match for closing said gate to advance said pulse counter one step for each received pulse, and means including said comparison circuit effective for opening said pulse gate when it determines from the potentials applied to said data-receiving conductors that the number in said camp-on register matches that in said called number register.

10. The combination recited in claim 9 wherein said system includes a line circuit for each line and wherein said comparison circuit comprises the line circuit of the called line on eah all.

11. The invention recited in claim 10 in combination with a bistable gate in each line circuit, and means in the called line circuit on a call for causing its gate to assume a first conductive state when the numbers in said two registers match and to assume a second conductive state when the numbers do not match.

12. In a telephone switching system equipped for providing camp-on service, a comparison circuit effective on every call received by said system for comparing the called line number with the number of every line currently being camped on, means for completing each call upon a determination by said comparison circuit that the called number does not match that of a line being camped on, and means effective for preventing a call from being completed upon a determination by said comparison circuit that the called number matches that of a line being camped on.

13. In a telephone switching system equipped for providing camp-on service and having a called number register into which is entered the called line number on each call served by said system, a camp-on register into which is entered the number of a line to be camped on whenever camp-on service is required on a call directed to a busy line, a comparison circuit effective whenever a line is being camped on for comparing the number stored in said camp-on register with that in said called number register on each call subsequently served by said system, means for completing each call upon a determination by said comparison circuit that the number in said called number register does not match that in said camp-on register, and means for preventing a call from being completed upon a determination by said comparison circuit that the number in said called number register matches that in said camp-on register.

14. In a telephone switching system having equipment for providing camp-on service and having a called number register into which is entered a called line number on each line served by said system, a plurality of data-receiving conductors connected to said register, a camp-on register for storing the number of a line being camped on during the serving of a camp-on call, means effective upon the receipt of a subsequently received call when a line is being camped on for connecting said camp-on register to said data-receiving conductors, means in each of said registers for applying output potentials indicative of its current registration to said conductors, a comparison circuit connected to said conductors, means in said comparison circuit operable in response to the potentials applied to said conductors by each of said registers for determining whether the number stored in said camp-on register matches that stored in said called number register for a subsequently received call, means for completing a call upon a determination by said comparison circuit that the number in said called number register does not match that in said camp-on register, and means for preventing a call from being completed upon a determination by said comparison circuit that the number in said called number register matches that in said camp-on register.

15. The combination recited in claim 14 wherein said system includes a line circuit for each line and wherein said comparison circuit comprises the line circuit of the called line on each call.

16. The invention recited in claim 15 in combination with a bistable gate in each line circuit, and means in the called line circuit on a call for causing its gate to assume a first conductive state if the numbers in said two registers match and to assume a second conductive state if the numbers do not match.

17. In a telephone switching system, equipment for providing camp-on service and having a called number register into which is entered the called line number on each call served by said system, a plurality of camp-on registers, means for entering the called line number on a plurality of calls into successive ones of said camp-on registers upon the receipt by said system of a plurality of calls simultaneously requiring camp-on service, means effective upon the receipt of a subsequent call by said system for comparing the number in said called number register with the number stored in successive ones of said camp-on registers, means for completing said subsequent call in the event that the number in said called number register does not match that in any of said camp-on registers, and means for preventing a subsequent call from being completed in the event that the number in said called number register matches that in one of said camp-on registers.

18. The invention defined in claim 17 wherein said means for completing comprises means for extending a call to the called line when it is idle, and means for entering the called number into one of said camp-on registers when the called line is busy.

19. The invention defined by claim 18 in combination with means for preventing a called number from being entered into one of said camp-on registers if the same number is currently in any one of said camp-on registers.

20. The invention defined in claim 17 wherein said last-named means includes means for returning busy tone to the calling circuit for said call regardless whether the called line is busy or idle.

21. In a telephone switching system equipped for providing camp-on service, a called line number register into which is entered the called line number on each call served by said system, a camp-on register, means effective whenever a called line is busy upon the receipt of an incoming call for automatically transferring the called line number from said called number register to said camp-on register, and means effective under control of said camp-on register for subsequently testing the camped-on called line for a busy condition.

22. The invention recited in claim 21 wherein said system includes a line circuit for each line in said system and wherein said means for testing comprises, means for reading out the camped-on called line number stored in said camp-on register, means effective upon said readout for applying a test signal to the line circuit for the camped-on line, and means in the camped-on line circuit responsive to said test signal for returning a signal signifying whether its line is currently busy or idle.

23. The invention recited in claim 21 in combination with means effective if said camped-on line is idle when tested for controlling the completion of said call directed to said line, and means effective if said camped-on line is busy when tested for subsequently retesting the busy condition of said camped-on line.

24. In a telephone switching system equipped for providing camp-on service and having a camp-on register into which is entered the number of a line to be camped on whenever camp-on service is required on a call, a line circuit for each line, a bistable gate in each line circuit, a plurality of data-receiving conductors connected between said line circuits and said register, means effective under control of said register during the serving of a camp-on call for testing the camped-on line for a busy condition by applying potentials indicative of the camped-on line number to said data conductors, means responsive to the application of said potentials to said conductors for switching only the state of the gate in said camped-on line circuit, means responsive to said switching whereby said camped-on line circuit returns a signal signifying whether it is currently busy or idle, means responsive to a signal indicating that the camped-on line is idle for controlling the completion of said call, and means responsive to a signal indicating that the camped-on line is busy for subsequently retesting the busy condition of said camped-on line.

25. In a telephone switching system equipped for providing camp-on service for a plurality of calls simultaneously and having a plurality of camp-on registers into which is entered the numbers of the lines to be camped on whenever camp-on service is required for a plurality of calls, means effective under control of said registers during the serving of a camp-on call for testing all camped-on lines for a busy condition, means effective if a camped-on line is idle when tested for controlling the completion of the call directed to it, and means effective if a camped-on line is busy when tested for subsequently retesting the busy condition of all camped-on lines.

26. The invention recited in claim 25 wherein said system includes a line circuit for each line in said system and wherein said means for testing comprises, means for sequentially reading out the number in each of said camp-on registers, means effective upon said readout of each register for applying a test signal to only the line circuit for the camped-on line represented by the number in the register being read out, and means in the camped-on line circuit responsive to the reception of said test signal for returning a signal signifying whether its line is busy or idle.

27. In a telephone switching system equipped for providing camp-on service and having a plurality of camp-on registers into each of which is entered the number of a different line to be camped on whenever camp-on service is required for a plurality of calls simultaneously, a plurality of lines, a line circuit for each line, a bistable gate in each line circuit, a group of data-receiving conductors connected between said line circuits and each of said camp-on registers, means effective under control of said registers during the serving of camp-on calls for testing all camped-on lines for a busy condition by applying test potentials indicative of the camped-on line numbers sequentially to said data conductors, means responsive to each application of said test potentials for switching only the state of the gate in the camped-on line circuit represented by the applied potentials, means responsive to said switching whereby said last-named camped-on line circuit returns a signal signifying whether it is busy or idle, means responsive to a signal indicating that a camped-on line is idle when tested for controlling the completion of the call directed to it, and means responsive to a signal indicating that a camped-on line is busy when tested for subsequently retesting the busy condition of the line.

28. The combination defined in claim 27 in combination with a plurality of series connected monostable pulse generators, each of which is individually associated with a different one of said camp-on registers, means for initiating a test of all camped-on lines by applying an input pulse to the first generator in said series, means including said first generator for generating an output pulse having a predetermined duration in response to the receipt of said input pulse, register readout means responsive to said output pulse for applying said test potentials from said first camp-on register to said data conductors for the duration of said output pulse, means responsive to the termination of said output pulse by said first generator for causing the subsequent generators to generate output pulses sequentially, and means including said register readout means whereby said test potentials are applied to said data conductors from each subsequent camp-on register for the duration of the output pulse from its associated pulse generator.

29. The invention defined in claim 28 in which said register readout means comprises a normally blocked readout gate interconnected between said data conductors and each of said camp-on registers, and means for applying the output of each pulse generator to the readout gate for its associated camp-on register whereby said test potentials are applied to said data conductors from each register for the pulse duration.

30. In a switching system having lines and a switching network, means responsive to the receipt of each call by said system for determining the current idle or busy state of the line to which the call is directed, a camp-on circuit, means for establishing a network path between a calling circuit and a called line that is determined to be idle, means responsive to a determination that a called line is busy for establishing a network path between the calling circuit and said camp-on circuit, and means effective when said called line becomes idle for disconnecting the network path between said camp-on circuit and said calling circuit and for establishing a network path between said calling circuit and said called line.

31. The invention recited in claim 30 in combination with means for repeatedly testing the busy condition of a camped-on line to determine when it becomes idle.

32. The invention recited in claim 31 in combination with means for preventing any subsequently received call from obtaining a connection to a camped-on line ahead of the calling circuit connected to said camp-on circuit.

33. The invention defined by claim 32 in combination with means for preventing more than one calling circuit at a time from camping on a single called line.

34. In a switching system, lines, trunks, a switching network, a called number register, means effective during the serving of every call for entering the called line number into the called number register, means responsive to said registration for establishing a network connection between an incoming calling trunk and an idle called line, a camp-on circuit, means responsive to said registration whenever said called line is busy for establishing a connection via said network between said calling trunk and said camp-on circuit, a camp-on register in said camp-on circuit, means responsive to said connection of said camp-on circuit for entering the called number in said called number register into said camp-on register, means operative under control of said camp-on register for repeatedly testing the busy condition of a camped-on line, means responsive to each test for transmitting a signal to said camp-on circuit indicating whether the camped-on line is busy or idle, means in said camp-on circuit responsive to a signal indicating the camped-on line is busy for initiating a subsequent test of said camped-on line, means in said camp-on circuit responsive to a signal indicating that the camp-on circuit is idle for disconnecting said network path between said calling trunk and said camp-on circuit, and additional means responsive thereto for establishing a network path between said calling trunk and said camped-on line.

35. In a switching system, lines, trunks, a switching network, a called number register, means effective during the serving of every call for entering the called line number into said called number register, means responsive to said registration for establishing a network connection between an incoming calling trunk and an idle called line, a camp-on circuit common to all of said lines, and means responsive to said registration whenever said called line is busy for establishing a connection via said network between said calling trunk and said camp-on circuit.

36. The invention recited in claim 35 in combination with a camp-on register in said camp-on circuit, means responsive to said connection of said camp-on circuit for entering the called number in said called number register into said camp-on register, a line circuit for each line, a plurality of data-receiving conductors interconnecting said called number register with said camp-on register and with said line circuits, a bistable gate in each of said line circuits, means for repeatedly testing the busy condition of a camped-on line by applying potentials indicative of the camped-on line number from said camp-on register to said data conductors, means responsive to the application of said potentials for causing only the bistable gate of said camped-on line circuit to switch its conductive condition, and means in said camped-on line circuit responsive to said switch for returning a signal indicating whether it is currently busy or idle.

37. The invention of claim 36 in combination with means including said camp-on circuit responsive to a signal indicating that the camped-on line is busy for initiating a subsequent test of said camped-on line, means including said camp-on circuit responsive to a signal indicating that the camp-on circuit is idle for disconnecting said network path between said calling trunk and said camp-on circuit, and additional means responsive thereto for establishing a network path between said calling trunk and said camped-on line.

38. The invention defined by claim 35 in combination with a plurality of camp-on registers in said camp-on circuit, means for ordering the sequence in which each camp-on register will serve subsequent calls requiring camp-on service, and means responsive to the subsequent receipt of a call requiring camp-on service for entering the number of the line to be camped on into the camp-on register selected for the serving of the next camp-on call.

39. The invention defined by claim 38 wherein each camp-on register has an associated network appearance, and means effective upon receipt of a call requiring camp-on service for connecting the calling trunk to the network appearance of the camp-on register currently storing the number of the called line to be camped on.

References Cited

UNITED STATES PATENTS

| | | | |
|---|---|---|---|
| 2,819,345 | 1/1958 | Nilsson ---------- | 179—18.211 |
| 3,050,590 | 8/1962 | Lomax --------- | 179—18.81 X |

KATHLEEN H. CLAFFY, *Primary Examiner.*

L. A. WRIGHT, *Assistant Examiner.*